(12) United States Patent
Goudarzi et al.

(10) Patent No.: US 11,520,621 B2
(45) Date of Patent: Dec. 6, 2022

(54) COMPUTATIONAL INSTANCE BATCHING AND AUTOMATION ORCHESTRATION BASED ON RESOURCE USAGE AND AVAILABILITY

(71) Applicant: ServiceNow, Inc., Santa Clara, CA (US)

(72) Inventors: Khashayar Goudarzi, Mukilteo, WA (US); Wenhui Li, Sammamish, WA (US); Sharath Vaddempudi, Kirkland, WA (US); Kavish Jain, Bellevue, WA (US); Shaoying Zou, Bellevue, WA (US); Yerjan Khurmyetbyek, Kirkland, WA (US); Swathi Pattapu, Kirkland, WA (US)

(73) Assignee: ServiceNow, Inc., Santa Clara, CA (US)

( * ) Notice: Subject to any disclaimer, the term of this patent is extended or adjusted under 35 U.S.C. 154(b) by 495 days.

(21) Appl. No.: 16/551,416

(22) Filed: Aug. 26, 2019

(65) Prior Publication Data
US 2021/0064420 A1   Mar. 4, 2021

(51) Int. Cl.
G06F 9/46 (2006.01)
G06F 9/48 (2006.01)
H04L 67/10 (2022.01)
H04L 67/01 (2022.01)

(52) U.S. Cl.
CPC ............ *G06F 9/4881* (2013.01); *H04L 67/01* (2022.05); *H04L 67/10* (2013.01)

(58) Field of Classification Search
CPC ........ G06F 9/4881; H04L 67/10; H04L 67/42
See application file for complete search history.

(56) References Cited

U.S. PATENT DOCUMENTS

| | | | |
|---|---|---|---|
| 5,978,594 | A | 11/1999 | Bonnell |
| 6,321,229 | B1 | 11/2001 | Goldman |
| 6,609,122 | B1 | 8/2003 | Ensor |
| 6,799,189 | B2 | 9/2004 | Huxoll |
| 6,816,898 | B1 | 11/2004 | Scarpelli |

(Continued)

OTHER PUBLICATIONS

Kherbache et al.; "Scheduling Live Migration of Virtual Machines", IEEE Transactions on Cloud Computing, No. 1, Dec. 20, 2017 (XP055744311); p. 14.

(Continued)

*Primary Examiner* — Wissam Rashid
(74) *Attorney, Agent, or Firm* — Fletcher Yoder PC

(57) ABSTRACT

An embodiment may involve server devices arranged into pods, each server device hosting computational instances, and a central computational instance configured to: (i) obtain per-pod lists of the instances hosted by the pods; (ii) determine a maximum number of the instances to arrange into batches; (iii) determine a group size for groups of the instances that are to be placed into the batches; (iv) execute a first phase that involves removing per-pod groups from the per-pod lists and adding them to the batches, until less of the instances than the group size remains in each of the per-pod lists; (v) execute a second phase that involves removing one of the instances from the per-pod lists and adding it to the batches, until none of the instances remains in any of the per-pod lists; and (vi) schedule one or more of the automations to take place in the data center.

20 Claims, 16 Drawing Sheets

(56) References Cited

U.S. PATENT DOCUMENTS

| | | |
|---|---|---|
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,877,783 B1 | 1/2011 | Cline |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueeler |
| 9,412,084 B2 | 9/2016 | Kowalski |
| 9,467,344 B2 | 10/2016 | Gere |
| 9,535,737 B2 | 1/2017 | Joy |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 10,002,203 B2 | 6/2018 | George |
| 2014/0075031 A1* | 3/2014 | Doering ............ H04L 47/70 709/226 |
| 2015/0207755 A1* | 7/2015 | Tsai ............ H04L 47/76 709/226 |
| 2016/0266919 A1 | 9/2016 | Wang |
| 2018/0349166 A1 | 12/2018 | Movsisyan et al. |

OTHER PUBLICATIONS

Wang et al.; Virtual Machine Migration Planning in Software-Defined Networks, 2015 IEEE Conference on Computer Communications (INFOCOM); Apr. 26, 2015, (CP033208309), pp. 487-495.

International Search Report & Written Opinion for PCT Application No. PCT/US2020/046016 dated Nov. 6, 2020; 11 pgs.

* cited by examiner

SERVER DEVICES AND COMPUTATIONAL INSTANCES ← 800

SD1 = {IN1-1, IN1-2, IN1-3, IN1-4, IN1-5, IN1-6, IN1-7, IN1-8, IN1-9}

SD2 = {IN2-1, IN2-2, IN2-3, IN2-4, IN2-5, IN2-6}

SD3 = {IN3-1, IN3-2}

SD4 = {IN4-1, IN4-2, IN4-3, IN4-4, IN4-5, IN4-6, IN4-7, IN4-8}

SD5 = {IN5-1, IN5-2, IN5-3, IN5-4, IN5-5, IN5-6}

SD6 = {IN6-1}

SD7 = {IN7-1, IN7-2, IN7-3, IN7-4, IN7-5, IN7-6, IN7-7}

SD8 = {IN8-1, IN8-2, IN8-3, IN8-4}

SD9 = {IN9-1, IN9-2, IN9-3, IN9-4, IN9-5, IN9-6, IN9-7, IN9-8, IN9-9}

SD10 = {IN10-1, IN10-2, IN10-3, IN10-4, IN10-5, IN10-6, IN10-7, IN10-8, IN10-9}

PODS ← 802

POD1 = {SD1, SD2, SD3} = {{IN1-1, IN1-2, IN1-3, IN1-4, IN1-5, IN1-6, IN1-7, IN1-8, IN1-9}, {IN2-1, IN2-2, IN2-3, IN2-4, IN2-5, IN2-6}, {IN3-1, IN3-2}}

POD2 = {SD4, SD5, SD6, SD7, SD8} = {{IN4-1, IN4-2, IN4-3, IN4-4, IN4-5, IN4-6, IN4-7, IN4-8}, {IN5-1, IN5-2, IN5-3, IN5-4, IN5-5, IN5-6}, {IN6-1}, {IN7-1, IN7-2, IN7-3, IN7-4, IN7-5, IN7-6, IN7-7}, {IN8-1, IN8-2, IN8-3, IN8-4}}

POD3 = {SD9, SD10} = {{IN9-1, IN9-2, IN9-3, IN9-4, IN9-5, IN9-6, IN9-7, IN9-8, IN9-9}, {IN10-1, IN10-2, IN10-3, IN10-4, IN10-5, IN10-6, IN10-7, IN10-8, IN10-9}}

ALL PODS IN DATA CENTER ← 804

AP = {POD1, POD2, POD3}

FIG. 8A

```
//    Gather data on pods, server devices, and computational instances

1.    Let M = the maximum number of computational instances per batch

2.    Let BatchList = {{}}

3.    Let LB point to the last list in BatchList                        ←—810

4.    For each datacenter D:

4.1   Let AP = all pods in D 4.2   For each pod P in AP:

4.2.1 Let DS = a list of all server devices in P 4.2.2 Sort DS in descending order by the number of computational instances in
              each server device 4.2.3 Let IP = the list of all computational instances in DS 4.2.4 Let LP = the list of all computational instances per D by appending IP
              to LP //    Place blocks of computational instances into batches 4.3   Sort LP in descending order by size of IP 4.4   Let N = (M-len(LB)) / len(AP)

4.5   For each pod P in AP, repeating until no blocks of N computational instances
          are available:

4.5.1 Remove N computational instances from the beginning of P's part of LP
              and append them to LB, 4.5.2 If len(LB) = M, add an empty list to the end of LB and let LB point to
              that list //    Place any remaining computational instances into batches one by one 4.6   Let N = 1

4.7   For each pod P in AP, repeating until no blocks of N computational instances
          are available:

4.7.1 Remove N computational instances from the beginning of P's part of LP
              and append them to LB 4.7.2 If len(LB) = M, add an empty list to the end of LB and let LB point to
              that list 4.8   Find any computational instances that are unassigned to batches, and add them
          to the end of BatchList
```

FIG. 8B

```
STEP 4.2 FOR POD1:

DS = {SD1, SD2, SD3} = {{IN1-1, IN1-2, IN1-3, IN1-4, IN1-5, IN1-6, IN1-7, IN1-8, IN1-
    9}, {IN2-1, IN2-2, IN2-3, IN2-4, IN2-5, IN2-6}, {IN3-1, IN3-2}}

IP = {IN1-1, IN1-2, IN1-3, IN1-4, IN1-5, IN1-6, IN1-7, IN1-8, IN1-9, IN2-1, IN2-2,
    IN2-3, IN2-4, IN2-5, IN2-6, IN3-1, IN3-2}

LP = {{IN1-1, IN1-2, IN1-3, IN1-4, IN1-5, IN1-6, IN1-7, IN1-8, IN1-9, IN2-1, IN2-2,
    IN2-3, IN2-4, IN2-5, IN2-6, IN3-1, IN3-2}}

STEP 4.2 FOR POD2:

DS = {SD4, SD5, SD6, SD7, SD8} = {{IN4-1, IN4-2, IN4-3, IN4-4, IN4-5, IN4-6, IN4-7,
    IN4-8}, {IN7-1, IN7-2, IN7-3, IN7-4, IN7-5, IN7-6, IN7-7}, {IN5-1, IN5-2, IN5-3,
    IN5-4, IN5-5, IN5-6}, {IN8-1, IN8-2, IN8-3, IN8-4}, {IN6-1}}

IP = {IN4-1, IN4-2, IN4-3, IN4-4, IN4-5, IN4-6, IN4-7, IN4-8, IN7-1, IN7-2, IN7-3,
    IN7-4, IN7-5, IN7-6, IN7-7, IN5-1, IN5-2, IN5-3, IN5-4, IN5-5, IN5-6, IN8-1,
    IN8-2, IN8-3, IN8-4, IN6-1}

LP = {{IN1-1, IN1-2, IN1-3, IN1-4, IN1-5, IN1-6, IN1-7, IN1-8, IN1-9, IN2-1, IN2-2,
    IN2-3, IN2-4, IN2-5, IN2-6, IN3-1, IN3-2}, {IN4-1, IN4-2, IN4-3, IN4-4, IN4-5,
    IN4-6, IN4-7, IN4-8, IN7-1, IN7-2, IN7-3, IN7-4, IN7-5, IN7-6, IN7-7, IN5-1,
    IN5-2, IN5-3, IN5-4, IN5-5, IN5-6, IN8-1, IN8-2, IN8-3, IN8-4, IN6-1}}

STEP 4.2 FOR POD3:

DS = {SD9, SD10} = {{IN9-1, IN9-2, IN9-3, IN9-4, IN9-5, IN9-6, IN9-7, IN9-8, IN9-9},
    {IN10-1, IN10-2, IN10-3, IN10-4, IN10-5, IN10-6, IN10-7, IN10-8, IN10-9}}

IP = {IN9-1, IN9-2, IN9-3, IN9-4, IN9-5, IN9-6, IN9-7, IN9-8, IN9-9, IN10-1, IN10-2,
    IN10-3, IN10-4, IN10-5, IN10-6, IN10-7, IN10-8, IN10-9}

LP = {{IN1-1, IN1-2, IN1-3, IN1-4, IN1-5, IN1-6, IN1-7, IN1-8, IN1-9, IN2-1, IN2-2,
    IN2-3, IN2-4, IN2-5, IN2-6, IN3-1, IN3-2}, {IN4-1, IN4-2, IN4-3, IN4-4, IN4-5,
    IN4-6, IN4-7, IN4-8, IN7-1, IN7-2, IN7-3, IN7-4, IN7-5, IN7-6, IN7-7, IN5-1,
    IN5-2, IN5-3, IN5-4, IN5-5, IN5-6, IN8-1, IN8-2, IN8-3, IN8-4, IN6-1}, {IN9-1,
    IN9-2, IN9-3, IN9-4, IN9-5, IN9-6, IN9-7, IN9-8, IN9-9, IN10-1, IN10-2, IN10-3,
    IN10-4, IN10-5, IN10-6, IN10-7, IN10-8, IN10-9}}

STEP 4.3:

LP = {{IN4-1, IN4-2, IN4-3, IN4-4, IN4-5, IN4-6, IN4-7, IN4-8, IN7-1, IN7-2, IN7-3,
    IN7-4, IN7-5, IN7-6, IN7-7, IN5-1, IN5-2, IN5-3, IN5-4, IN5-5, IN5-6, IN8-1,
    IN8-2, IN8-3, IN8-4, IN6-1}, {IN9-1, IN9-2, IN9-3, IN9-4, IN9-5, IN9-6, IN9-7,
    IN9-8, IN9-9, IN10-1, IN10-2, IN10-3, IN10-4, IN10-5, IN10-6, IN10-7, IN10-8,
    IN10-9}, {IN1-1, IN1-2, IN1-3, IN1-4, IN1-5, IN1-6, IN1-7, IN1-8, IN1-9, IN2-1,
    IN2-2, IN2-3, IN2-4, IN2-5, IN2-6, IN3-1, IN3-2}}

STEP 4.4:

N = (M - len(LB)) / len(AP) = (15-0) / 3 = 5
```

FIG. 8C

STEP 4.5, FIRST ITERATION:

BatchList = {{IN1-1, IN1-2, IN1-3, IN1-4, IN1-5, IN4-1, IN4-2, IN4-3, IN4-4, IN4-5,
    IN9-1, IN9-2, IN9-3, IN9-4, IN9-5}}

LP = {{IN4-6, IN4-7, IN4-8, IN7-1, IN7-2, IN7-3, IN7-4, IN7-5, IN7-6, IN7-7, IN5-1,
    IN5-2, IN5-3, IN5-4, IN5-5, IN5-6, IN8-1, IN8-2, IN8-3, IN8-4, IN6-1}, {IN9-6,
    IN9-7, IN9-8, IN9-9, IN10-1, IN10-2, IN10-3, IN10-4, IN10-5, IN10-6, IN10-7,
    IN10-8, IN10-9}, {IN1-6, IN1-7, IN1-8, IN1-9, IN2-1, IN2-2, IN2-3, IN2-4, IN2-5,
    IN2-6, IN3-1, IN3-2}}

STEP 4.5, SECOND ITERATION:

BatchList = {{IN1-1, IN1-2, IN1-3, IN1-4, IN1-5, IN4-1, IN4-2, IN4-3, IN4-4, IN4-5,
    IN9-1, IN9-2, IN9-3, IN9-4, IN9-5}, {IN1-6, IN1-7, IN1-8, IN1-9, IN2-1, IN4-6,
    IN4-7, IN4-8, IN7-1, IN7-2, IN9-6, IN9-7, IN9-8, IN9-9, IN10-1}}

LP = {{IN7-3, IN7-4, IN7-5, IN7-6, IN7-7, IN5-1, IN5-2, IN5-3, IN5-4, IN5-5, IN5-6,
    IN8-1, IN8-2, IN8-3, IN8-4, IN6-1}, {IN10-2, IN10-3, IN10-4, IN10-5, IN10-6,
    IN10-7, IN10-8, IN10-9}, {IN2-2, IN2-3, IN2-4, IN2-5, IN2-6, IN3-1, IN3-2}}

STEP 4.5, THIRD ITERATION:

BatchList = {{IN1-1, IN1-2, IN1-3, IN1-4, IN1-5, IN4-1, IN4-2, IN4-3, IN4-4, IN4-5,
    IN9-1, IN9-2, IN9-3, IN9-4, IN9-5}, {IN1-6, IN1-7, IN1-8, IN1-9, IN2-1, IN4-6,
    IN4-7, IN4-8, IN7-1, IN7-2, IN9-6, IN9-7, IN9-8, IN9-9, IN10-1}, {IN2-2, IN2-3,
    IN2-4, IN2-5, IN2-6, IN7-3, IN7-4, IN7-5, IN7-6, IN7-7, IN10-2, IN10-3, IN10-4,
    IN10-5, IN10-6}}

LP = {{IN5-1, IN5-2, IN5-3, IN5-4, IN5-5, IN5-6, IN8-1, IN8-2, IN8-3, IN8-4, IN6-1},
    {IN10-7, IN10-8, IN10-9}, {IN3-1, IN3-2}}

STEP 4.5, FOURTH ITERATION:

BatchList = {{IN1-1, IN1-2, IN1-3, IN1-4, IN1-5, IN4-1, IN4-2, IN4-3, IN4-4, IN4-5,
    IN9-1, IN9-2, IN9-3, IN9-4, IN9-5}, {IN1-6, IN1-7, IN1-8, IN1-9, IN2-1, IN4-6,
    IN4-7, IN4-8, IN7-1, IN7-2, IN9-6, IN9-7, IN9-8, IN9-9, IN10-1}, {IN7-3, IN7-4,
    IN7-5, IN7-6, IN7-7, IN10-2, IN10-3, IN10-4, IN10-5, IN10-6, IN2-2, IN2-3, IN2-
    4, IN2-5, IN2-6}, {IN5-1, IN5-2, IN5-3, IN5-4, IN5-5, IN5-6, IN8-1, IN8-2, IN8-
    3, IN8-4}}

```
STEP 4.7, FIRST ITERATION:

BatchList = {{IN4-1, IN4-2, IN4-3, IN4-4, IN4-5, IN9-1, IN9-2, IN9-3, IN9-4, IN9-5,
    IN1-1, IN1-2, IN1-3, IN1-4, IN1-5}, {IN4-6, IN4-7, IN4-8, IN7-1, IN7-2, IN9-6,
    IN9-7, IN9-8, IN9-9, IN10-1, IN1-6, IN1-7, IN1-8, IN1-9, IN2-1}, {IN7-3, IN7-4,
    IN7-5, IN7-6, IN7-7, IN10-2, IN10-3, IN10-4, IN10-5, IN10-6, IN2-2, IN2-3, IN2-
    4, IN2-5, IN2-6}, {IN5-1, IN5-2, IN5-3, IN5-4, IN5-5, IN5-6, IN8-1, IN8-2, IN8-
    3, IN8-4, IN3-1, IN6-1, IN10-7, IN10-8, IN10-9}}

LP = {{}, {}, {IN3-2}}

STEP 4.7, SECOND ITERATION:

BatchList = {{IN4-1, IN4-2, IN4-3, IN4-4, IN4-5, IN9-1, IN9-2, IN9-3, IN9-4, IN9-5,
    IN1-1, IN1-2, IN1-3, IN1-4, IN1-5}, {IN4-6, IN4-7, IN4-8, IN7-1, IN7-2, IN9-6,
    IN9-7, IN9-8, IN9-9, IN10-1, IN1-6, IN1-7, IN1-8, IN1-9, IN2-1}, {IN7-3, IN7-4,
    IN7-5, IN7-6, IN7-7, IN10-2, IN10-3, IN10-4, IN10-5, IN10-6, IN2-2, IN2-3, IN2-
    4, IN2-5, IN2-6}, {IN5-1, IN5-2, IN5-3, IN5-4, IN5-5, IN5-6, IN8-1, IN8-2, IN8-
    3, IN8-4, IN3-1, IN6-1, IN10-7, IN10-8, IN10-9}, {IN3-2}}

```
┌─────────────────────────────────────────────────────────┐
│ DETERMINE, BY AN ORCHESTRATION APPLICATION, THAT A TOTAL NUMBER OF
│ APPLICATION NODES ARE TO BE INITIATED ON A PLURALITY OF SERVER
│ DEVICES, THE SERVER DEVICES CONTAINING: (I) HIGH PRIORITY QUEUES FOR
│ INCOMING REQUESTS, ONE PER EACH OF THE SERVER DEVICES, AND (II) LOW   ← 950
│ PRIORITY QUEUES FOR THE INCOMING REQUESTS, ONE PER EACH OF THE
│ SERVER DEVICES, WHEREIN THE SERVER DEVICES ARE CONFIGURED TO
│ EXECUTE BACKGROUND PROCESSES THAT SERVE THE INCOMING REQUESTS
│ ON THE HIGH PRIORITY QUEUES WITH PREFERENCE OVER THE INCOMING
│ REQUESTS ON THE LOW PRIORITY QUEUES
└─────────────────────────────────────────────────────────┘
                                │
                                ▼
┌─────────────────────────────────────────────────────────┐
│ OBTAIN, BY THE ORCHESTRATION APPLICATION, A MINIMUM NUMBER OF THE
│ APPLICATION NODES ARE TO BE INITIATED BY WAY OF THE HIGH PRIORITY    ← 952
│ QUEUES
└─────────────────────────────────────────────────────────┘
                                │
                                ▼
┌─────────────────────────────────────────────────────────┐
│ ITERATIVELY TRANSMIT, BY THE ORCHESTRATION APPLICATION, REQUESTS
│ FOR INITIATION OF THE APPLICATION NODES UNTIL INITIATION HAS BEEN
│ REQUESTED FOR THE TOTAL NUMBER OF APPLICATION NODES, WHEREIN THE
│ REQUESTS INCLUDE FIRST INSTRUCTIONS TO FORCE BACKGROUND
│ PROCESSES TO INITIATE APPLICATION NODES BY WAY OF THE HIGH PRIORITY
│ QUEUES WHEN: (I) A FIRST COUNT OF APPLICATION NODES INITIATED TO THIS
│ POINT BY WAY OF THE HIGH PRIORITY QUEUES IS LESS THAN THE MINIMUM    ← 954
│ NUMBER, AND (II) A SECOND COUNT OF APPLICATION NODES INITIATED TO
│ THIS POINT BY WAY OF THE LOW PRIORITY QUEUES IS LESS THAN OR EQUAL
│ TO THE TOTAL NUMBER MINUS THE MINIMUM NUMBER, AND WHEREIN THE
│ REQUESTS INCLUDE SECOND INSTRUCTIONS THAT ALLOW THE BACKGROUND
│ PROCESSES TO INITIATE APPLICATION NODES BY WAY OF EITHER THE HIGH
│ PRIORITY QUEUES OR THE LOW PRIORITY QUEUES IN ALL OTHER CASES
└─────────────────────────────────────────────────────────┘
```

FIG. 9B

COMPUTATIONAL INSTANCE BATCHING AND AUTOMATION ORCHESTRATION BASED ON RESOURCE USAGE AND AVAILABILITY

BACKGROUND

A data center is typically a large facility that houses various types of computing devices, such as server devices, database devices, switches, routers, load balancers, firewalls, and so on. These computing devices may be arranged in various ways so that the data center can provide services to various entities (e.g., customers of the data center). The services provided may include web services, media services (e.g., streaming audio and/or video), general storage services, general computational services, and so on. In some cases, the services facilitated by a data center may be referred to as "cloud" or "cloud-based" services, due to their being physically separated from customer devices and networks, and accessible by way of the Internet.

Some data centers may house a remote network management platform that provides outsourced software services to enterprises. These software services may take the form of computational instances (e.g., a set of application nodes, database nodes, and associated infrastructure) that are each dedicated to a particular enterprise. Hundreds or thousands of such computational instances may exist in a single data center, controlled or managed by one or more central instances that are not used directly by any served enterprise.

For purposes of redundancy and high availability, the provider of a remote network management platform may use multiple, geographically-dispersed data centers, and may have the ability to move an enterprise's computational instance between these data centers. Such a move may be planned in response to a request from the enterprise. Or, in cases where the data center hosting the computational instance is exhibiting problems, a move may occur in an unplanned fashion as a failover.

SUMMARY

Moving or failing over a computational instance between data centers, as well as certain other data center operations such as database node restores and restarting application node software that carries out computational instance functionality, can be automated. These automations may take the form of scripts or programs that carry out a series of steps to obtain the desired outcome of the automation in an orderly fashion. Nonetheless, such automations can be expensive in terms of computational power, memory, and/or network bandwidth.

For example, consider an automation for moving a computational instance from a source data center to a target data center. The operations may involve querying a central instance of the source data center to determine the configuration of the computational instance, making any necessary modifications to the configuration, setting up a copy of this configuration at the target data center, updating the central instance of the target data center accordingly, copying the database content from the source data center to the target data center, initiating the application node software at the target data center, and then mapping any domain names associated with the computational instance to the target data center. There are multiple bottlenecks in this procedure, including central instance capacity, switch and/or router bandwidth, and Internet connection bandwidth at both data centers. Furthermore, as many such automations may take place in parallel, the infrastructure and capacity of a data center can easily become overwhelmed with automation demands.

The embodiments herein address these problems by pre-scheduling automations. On a regular basis (e.g., once per day), computational instances are placed in batches based on their resource utilization and possibly other factors, and the batches are ordered. When automations involving these computational instances are to be performed, they are carried out in order of batches, with a delay between when the automations of each batch are started. This results in automations being accomplished in a controlled fashion that limits the load on data center infrastructure.

Accordingly, a first example embodiment may involve obtaining, in a data center, per-pod lists of computational instances hosted by server devices arranged into pods, where each server device hosts one or more of the computational instances, and where the computational instances utilize application and database resources of the server devices and are associated with managed networks. The first example embodiment may also involve determining a maximum number of the computational instances to arrange into each of a plurality of batches, where the batches are used for scheduling automations in the data center. The first example embodiment may also involve determining a group size for groups of the computational instances that are to be placed into the batches, where one group at a time is placed into the batches, and where the group size is greater than one. The first example embodiment may also involve executing a first assignment phase that involves iteratively removing per-pod groups of the computational instances, each of the group size, from the per-pod lists and adding them to the batches, until less of the computational instances than the group size remains in each of the per-pod lists. The first example embodiment may also involve executing a second assignment phase that involves iteratively removing one of the computational instances from the per-pod lists and adding it to the batches, until none of the computational instances remains in any of the per-pod lists. The first example embodiment may also involve scheduling one or more of the automations to take place in the data center, where the automations are initiated one batch at a time.

Further, similar load mitigation techniques may be applied when conducting automated initiation of a computational instance's application nodes in a data center. In particular, an orchestration application may schedule application node initiation such that a predetermined percentage of application nodes are initiated with high priority, while the remainder are initiated with a priority that depends on the load and/or health status of the server devices on which the application nodes are to execute.

Thus, a second example embodiment may involve determining, by an orchestration application, that a total number of application nodes are to be initiated on a plurality of server devices. The server devices may contain: (i) high priority queues for incoming requests, one per each of the server devices, and (ii) low priority queues for the incoming requests, one per each of the server devices. Also, the server devices may be configured to execute background processes (e.g., daemons) that serve the incoming requests on the high priority queues with preference over the incoming requests on the low priority queues. The second example embodiment may also involve obtaining, by the orchestration application, a minimum number of the application nodes are to be initiated by way of the high priority queues. The second example embodiment may also involve iteratively transmitting, by the orchestration application, requests for initiation of the application nodes until initiation has been requested for the total number of application nodes. The requests may include first instructions to force background processes to initiate application nodes by way of the high priority queues when: (i) a first count of application nodes initiated to this point by way of the high priority queues is less than the minimum number, and (ii) a second count of application nodes initiated to this point by way of the low priority queues is less than or equal to the total number minus the minimum number. The requests may include second instructions that allow the background processes to initiate application nodes by way of either the high priority queues or the low priority queues in all other cases.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8A depicts data structures representing a data center, in accordance with example embodiments.

FIG. 8B depicts pseudocode for scheduling automations in a data center, in accordance with example embodiments.

FIG. 8C depicts the pseudocode applied to a data center, in accordance with example embodiments.

FIG. 8D depicts the pseudocode applied to a data center, in accordance with example embodiments.

FIG. 8E depicts the pseudocode applied to a data center, in accordance with example embodiments.

FIG. 9B is a flow chart, in accordance with example embodiments.

DETAILED DESCRIPTION

Figure 1:
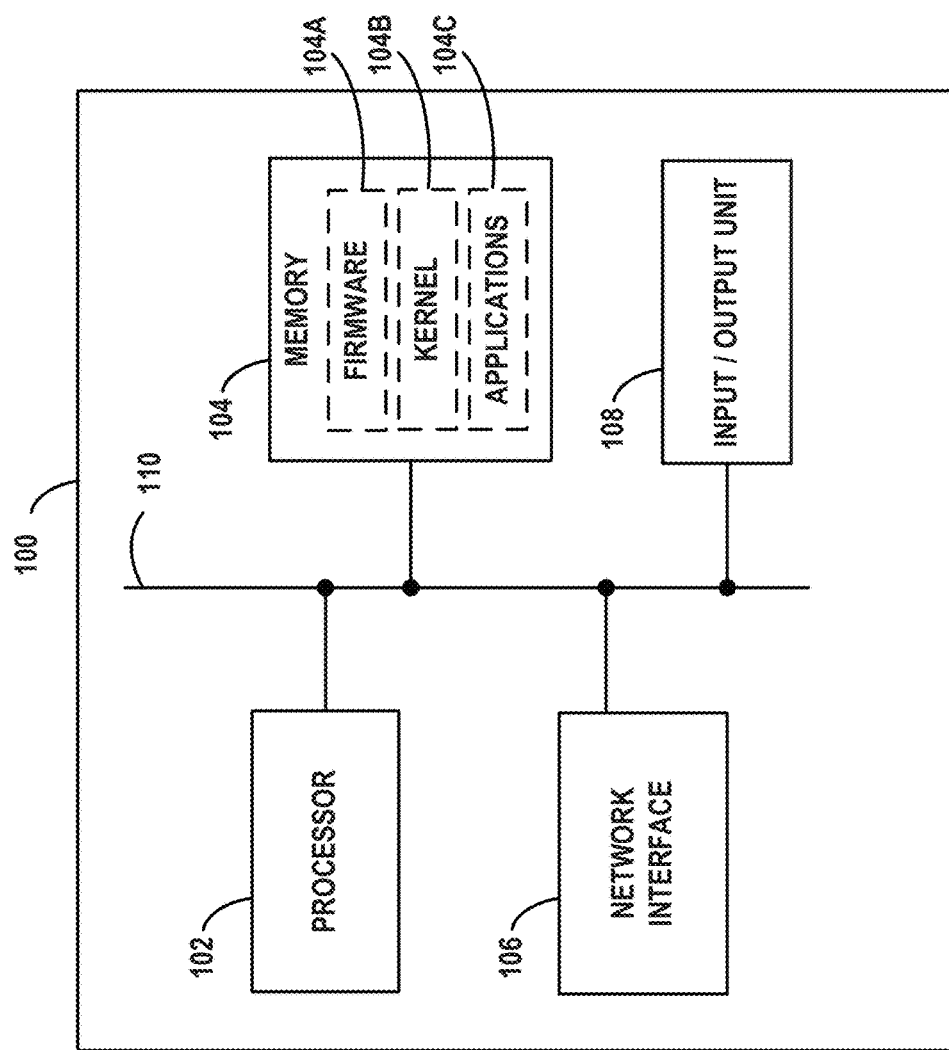
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
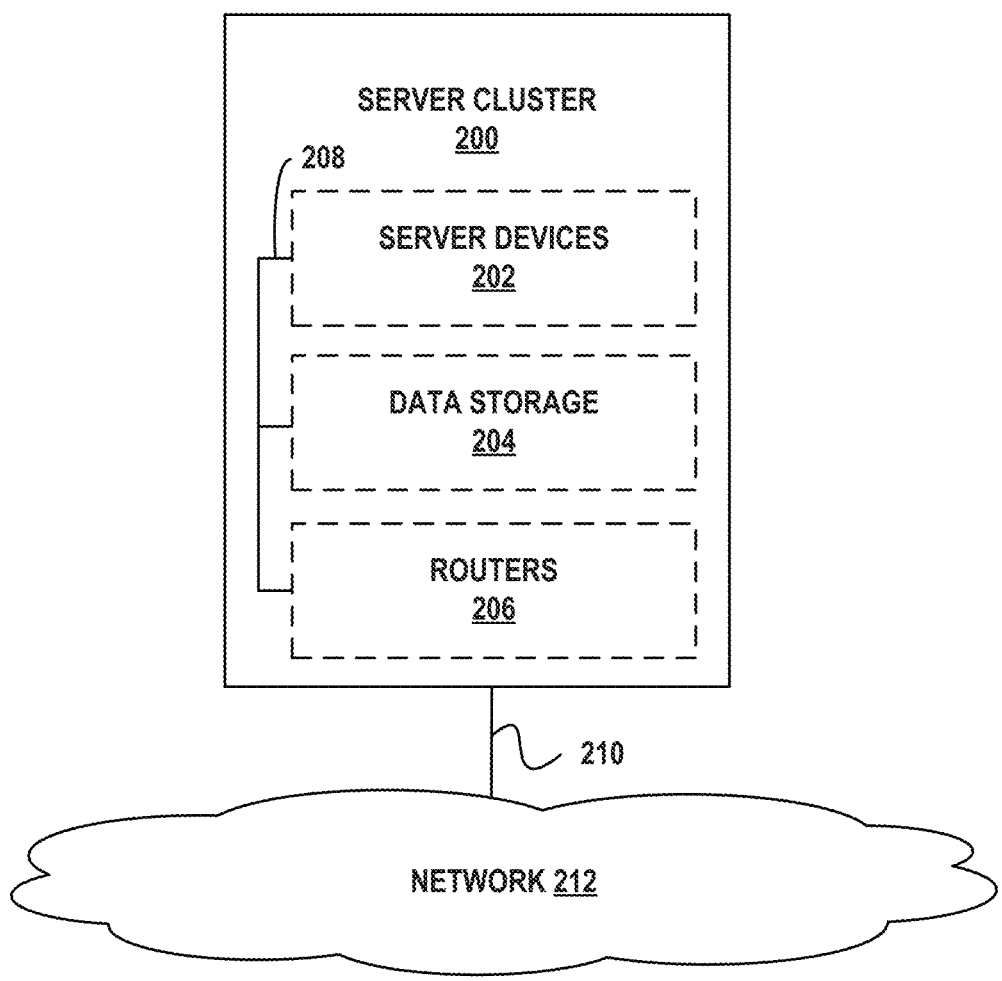
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
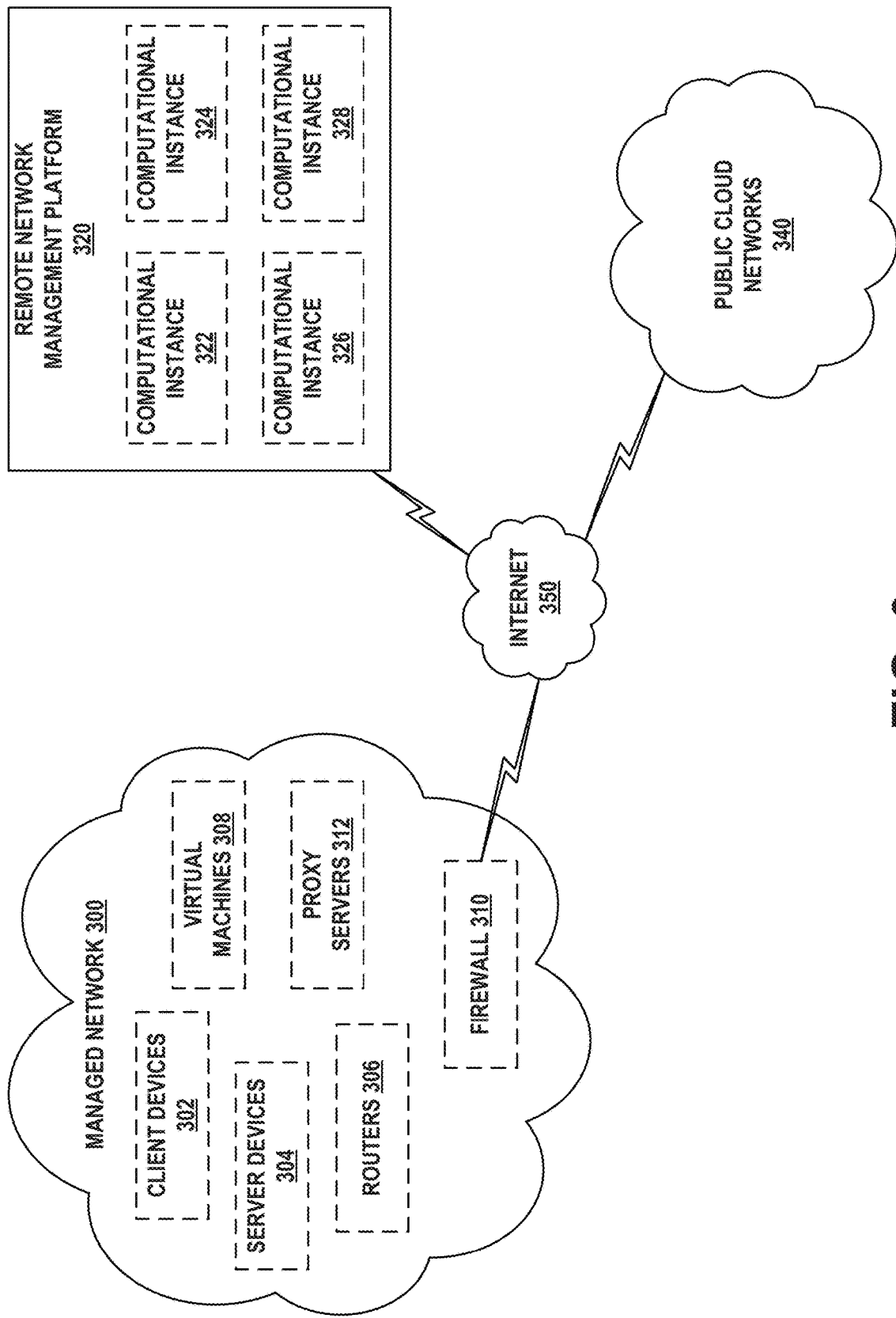
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
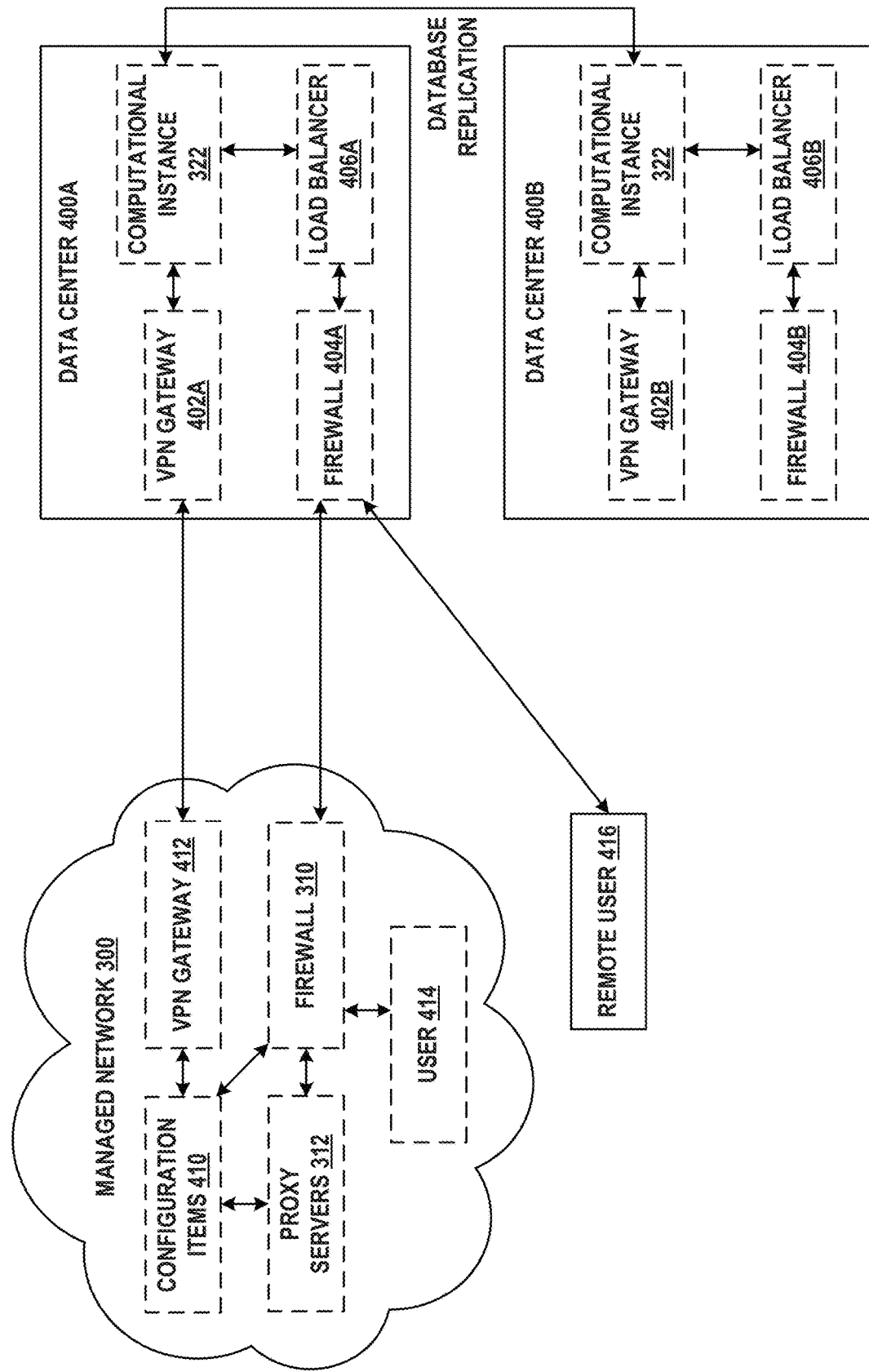
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
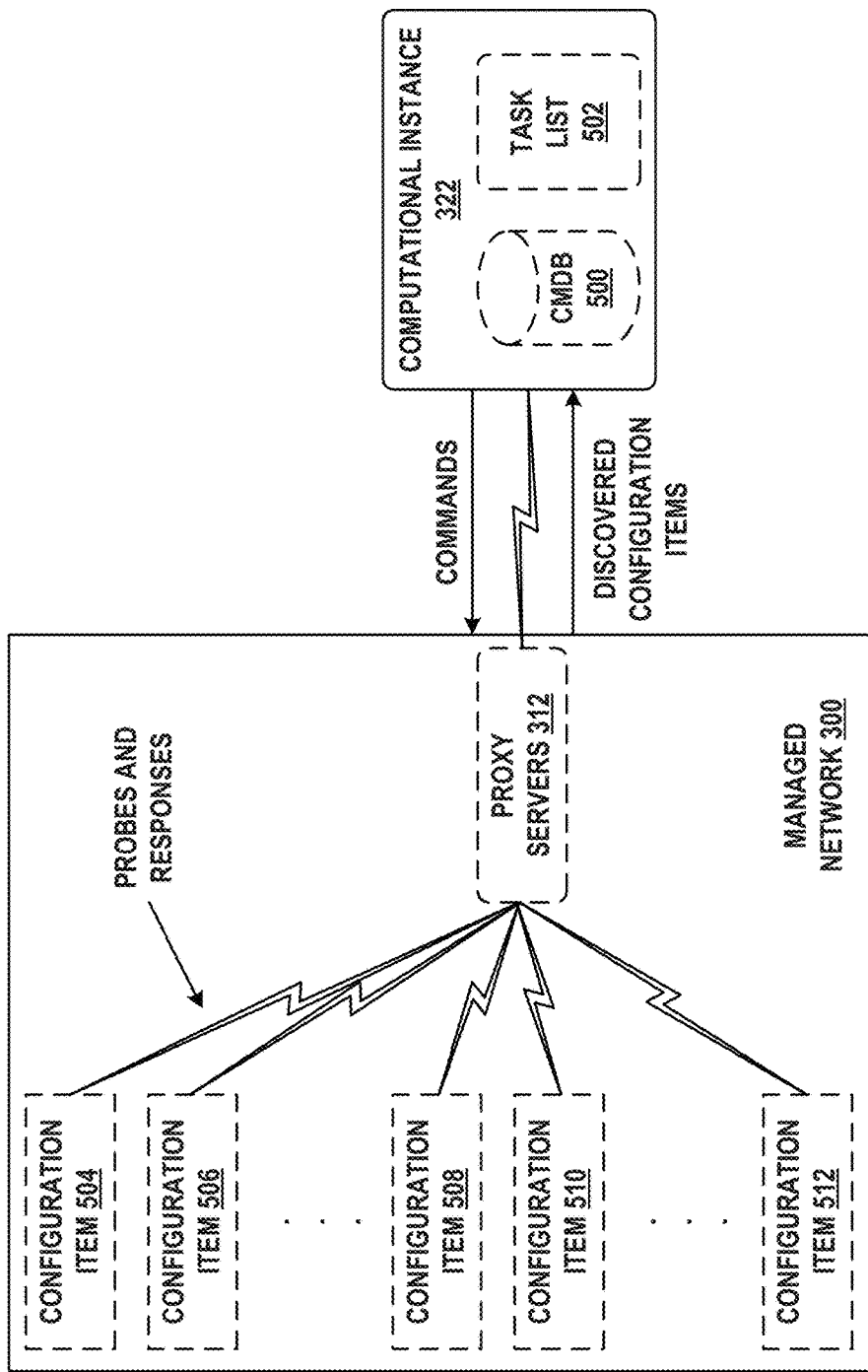
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
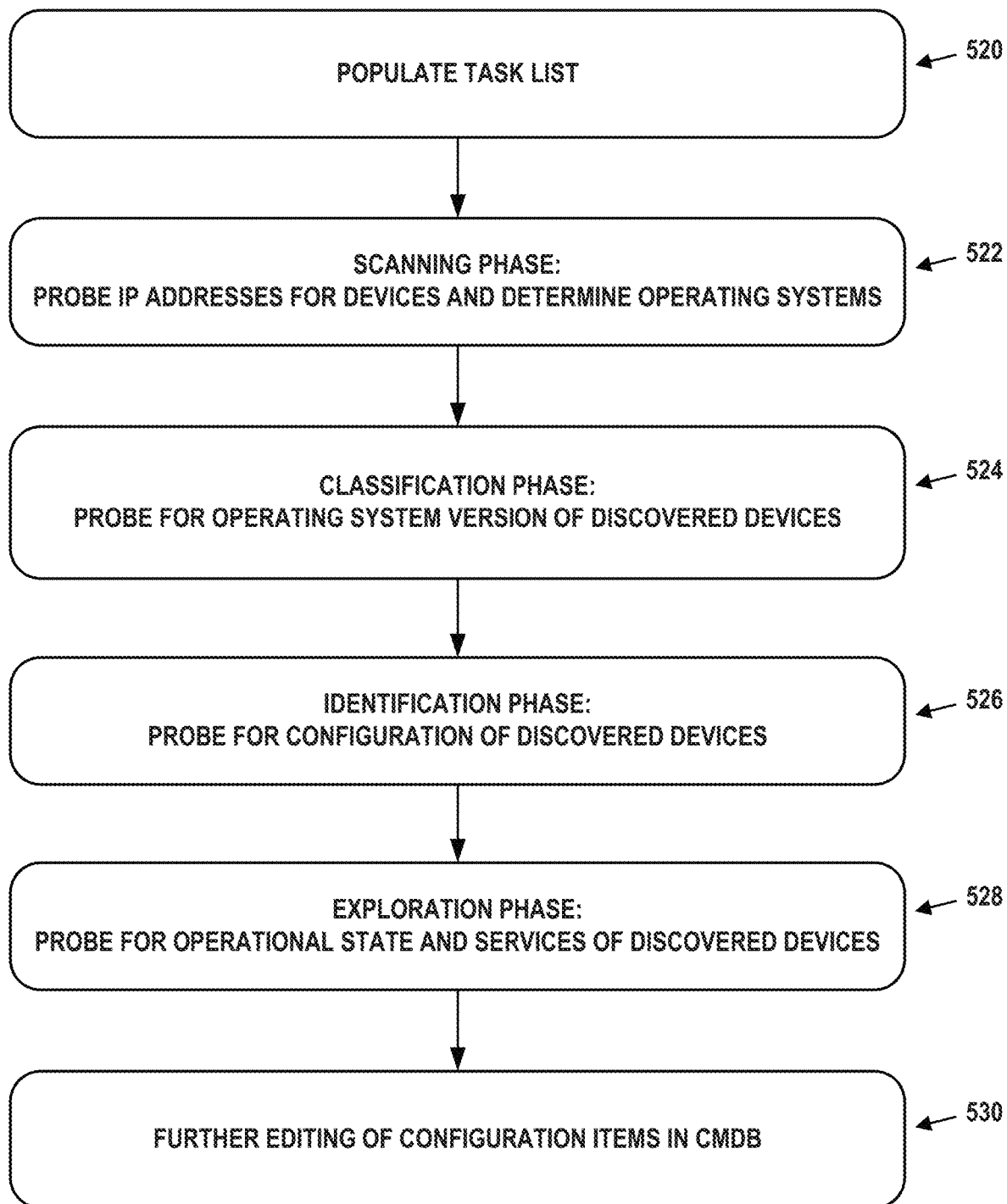
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Computational Instance Architecture

Figure 6:
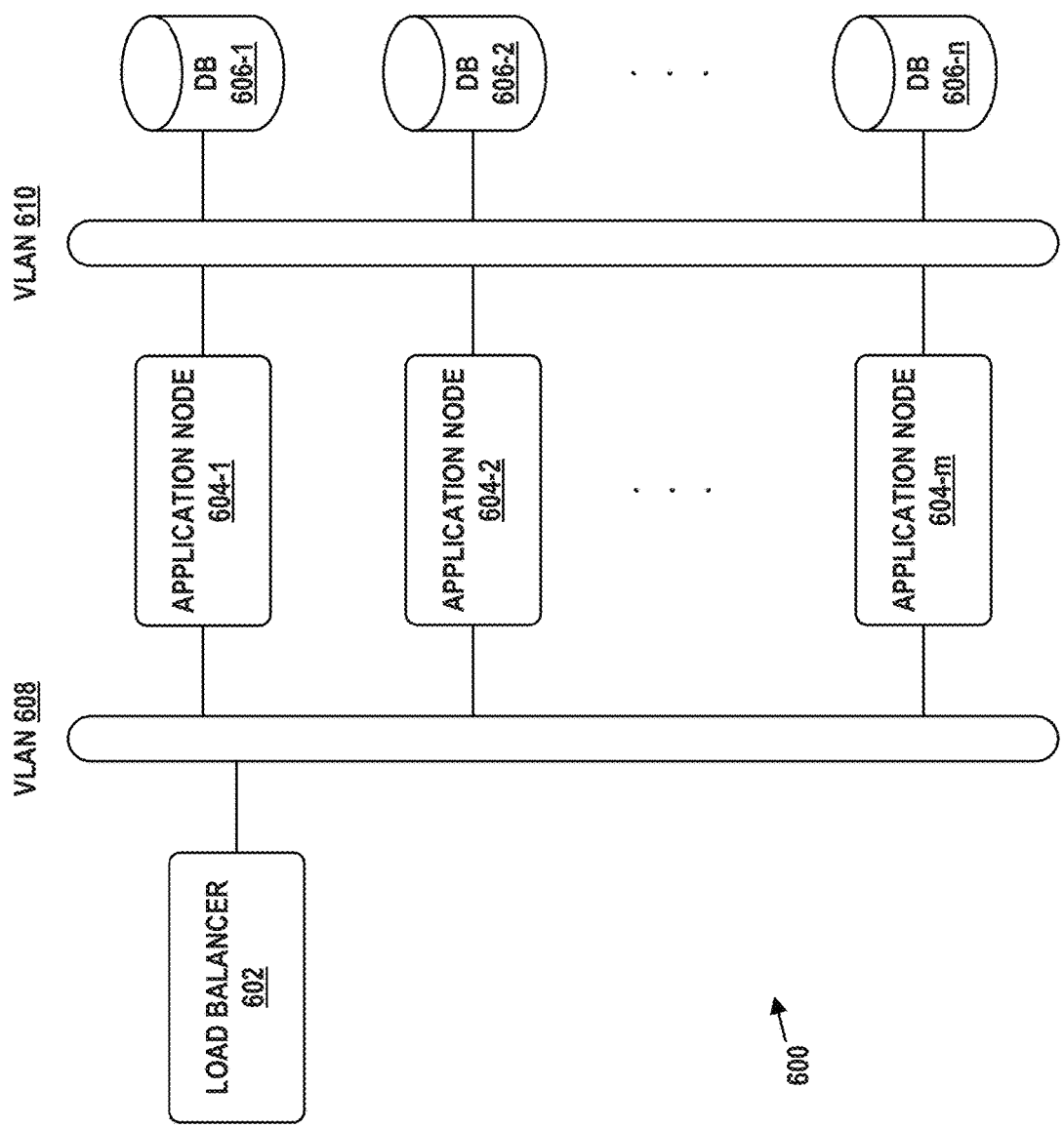
FIG. 6 depicts a computational instance architecture, in accordance with example embodiments.

FIG. 6 depicts example computational instance architecture 600. Therein, load balancer 602 distributes incoming traffic, by way of virtual local area network (VLAN) 608, to m application nodes 604-1, 604-2, . . . , 604-m. As noted previously, each application node executes a copy of the aPaaS software that provides the functionality of the computational instance. These application nodes access, by way of VLAN 610, one or more of n database nodes 606-1, 606-2, . . . , 606-n. Each database node may store information in one or more tables. Other arrangements of LANS, VLANs, and/or direct connections are possible.

In this context, a VLAN is partitioned and isolated from other VLANs at the data link layer level. Thus, for example, a single physical Ethernet LAN may be partitioned into multiple logical VLANs that are separate from one another. Each VLAN may be associated with a tag that is attached (e.g., prepended) to each packet transmitted thereon so that the VLAN to which each packet belongs can be unambiguously determined.

Various mappings of application nodes and database nodes to physical hardware may be possible. In some embodiments, all of the application nodes and database nodes of the computational instance execute on one or more dedicated server devices. In other embodiments, these application nodes and database nodes execute on one or more server devices that are shared with other computational instances. In various deployments, some of the application nodes and database nodes may execute on one or more virtual machines that, in turn, execute on one or more server devices. Thus, example computational instance architecture 600 may be arranged in various ways to provide aPaaS functionality on numerous physical hardware configurations.

In some embodiments, all of the application nodes and database nodes are "active" in that they perform functions for the enterprise associated with the computational instance. In other embodiments, some number of these nodes (e.g., half) are active and the rest are "standby." Standby nodes do not perform such functions for the enterprise. But, in the case that a node becomes unavailable or degraded, the system may take this node offline for at least a period of time (e.g., to perform a restart) and one of the standby nodes may take on its role. As such, changes to database nodes may be replicated to the standby database nodes so that the latter can rapidly assume active status with little or no data loss.

In some data centers, the physical server device hardware may include thin (e.g., 1-2 inches high) server appliances stacked and mounted into racks. In line with the discussion of FIG. 2, each server appliance may provide computation, storage, switching, or some combination thereof. Racks may be grouped into pods, each pod containing one or more racks.

Figure 7:
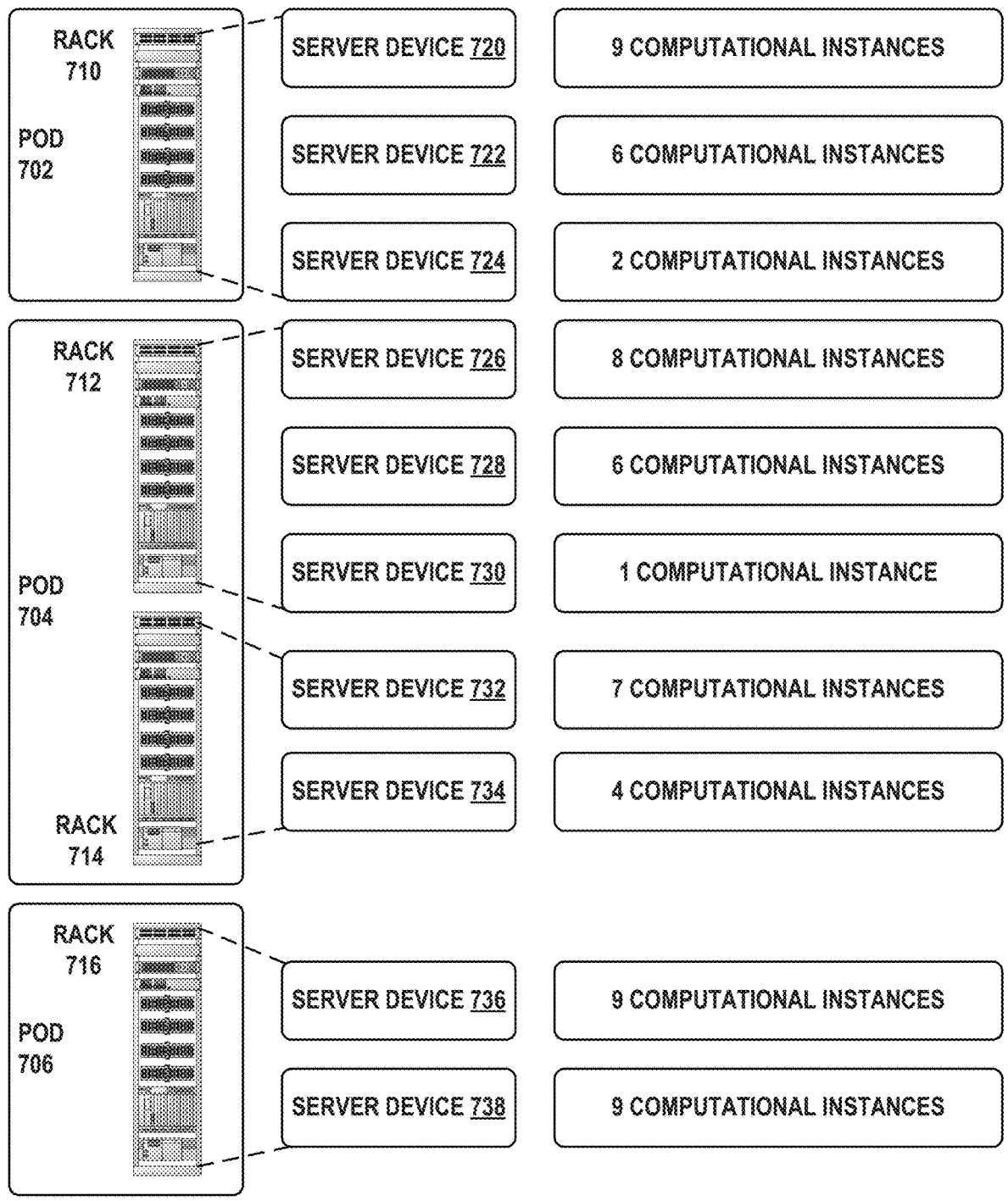
FIG. 7 depicts an arrangement of computational instances within a data center, in accordance with example embodiments.

To that point, FIG. 7 depicts an arrangement of computational instances within a data center. Data center 700 contains three pods 702, 704, and 706. Each pod is a logical or physical grouping of racks and may contain one or more racks. Particularly, pod 702 contains rack 710, pod 704 contains racks 712 and 714, and pod 706 contains rack 716.

Each rack includes one or more vertically-stacked hardware components. These components may include server devices, storage devices, switching devices, routers, patch panels, power supplies, and so on. For purposes of simplicity, it is assumed that server devices mounted in racks can host both application nodes and database nodes. But in some embodiments "server" devices may have more computational power and less storage than "storage" devices, and therefore server devices may host only application nodes and storage devices may host only database nodes.

In FIG. 7, rack 710 contains server devices 720, 722, and 724. Server device 720 contains 9 computational instances, while server device 722 contains 6 computational instances, and server device 724 contains 2 computational instances. Rack 712 contains server devices 726, 728, and 730. Server device 726 contains 8 computational instances, while server device 728 contains 6 computational instances, and server device 730 contains one computational instance. Rack 714 contains server devices 732 and 734. Server device 732 contains 7 computational instances, while server device 734 contains 4 computational instances. Rack 716 contains server devices 736 and 738. Server device 736 contains 9 computational instances while server device 738 also contains 9 computational instances.

In alternative embodiments, the computational instances shown in FIG. 7 may be application nodes, database nodes, or a combination of both, and may or may not include any standby nodes configured in a computational instance. As can be seen from the example arrangement of FIG. 7, the number of racks per pod, server devices per rack, computational instances per server device, application nodes, and database nodes, can vary.

One or more automations may be used to manage the lifecycle of computational instances. Herein, an automation is a form of program or script that orchestrates or carries out a series of steps to change some aspect of a computational instance with little or no human intervention. Such automations may include restarting an application node, restoring a database node, failing a computational instance over to a paired data center, moving a computational instance to a new data center, upgrading a computational instance, and so on.

Automations may be triggered by a messaging system based on representational state transfer (REST), the KAFKA® distributed streaming platform, the RABBITMQ® message broker, or some other mechanism. Background processes (daemons) may be executing on each server device in a computational instance to exchange communications, using this messaging system, with the central instance. Alternatively, the central instance may delegate some or all of its messaging tasks to a node in the computational instance.

Regardless, automations may be triggered periodically by software (e.g., application nodes may be automatically rebooted once per week during a maintenance window) or manually (e.g., a failover of a computational instance may be forced when its current data center is experiencing problems that could impact the performance of the instance). As hundreds or thousands of computational instances may reside within any particular data center, hundreds or thousands or automations may take place at various times during a given day.

To illustrate the challenges that are associated with unrestrained automations, consider the following scenario. A data center that supports 1000 computational instances has a problem in which 75% of its Internet connectivity fails (e.g., if the data center has a 1 gigabit per second link to the Internet, this link is effectively operating at 250 megabits per second). While the data center is still online, its ability to provide the expected level of service for all of its computational instances is severely limited. Monitoring nodes associated with the central instance may determine that a problem exists with the health of the data center, and may proactively trigger failover of all computational instances to their paired data centers. Alternatively, IT personnel may be notified of the problem and decide that these computational instances should be failed over.

If all 1000 computational instances begin failover operations simultaneously or at about the same time, at least two complications are likely to take place. First, each failover operation may require communication between the computational instance failing over and the central instance. If many or all computational instances are engaged in such communication at the same time, the central instance may be overwhelmed and respond slowly, which in turn may delay most or all of the failovers. Second, each failover operation may require communication between the computational instance and its paired data center, and this communication may use the already-impaired Internet link. In some cases, any un-replicated parts of databases in each computational instance may need to be transmitted to the appropriate paired data center, which can add up to many gigabytes of data over all computational instances.

As a result, a system that is already under stress and suffering from limited capacity is subjected to an unusually high amount of traffic, leading to network congestion and making a bad situation worse. In some cases, the failovers may not be able to complete or may take several times as long as expected to complete due to their being triggered simultaneously or nearly simultaneously.

Thus, it is advantageous to organize computational instances into batches such that expected automaton load is roughly balanced across these batches. Then, automations may be scheduled for execution one batch at a time—other words, automations for computational instances in a first batch are executed, then automations for computational instances in a second batch are executed, and so on. In some cases, no overlap is permitted between the execution of automations in different batches, and in other cases, some overlap is acceptable. Each type of automation (e.g., instance failover, instance move, node restart, database restore, etc.) may have its own schedule defined in this fashion.

Regardless, the result is that automations are spread out in time based in their expected resource consumption. This mitigates load on the central instance as well as network links and other infrastructure, and prevents a large or unlimited number of automations from executing simultaneously.

VI. Example Batching Algorithm

Automations to be performed in a data center may be pre-scheduled on a per-batch basis by placing computational instances, application nodes, and/or databases into an ordered list of batches. Factors such as the size of a computational instance (e.g., the number of application and database nodes therein and/or the size of the databases disposed within the database nodes), its traffic (e.g., counts of bytes flowing into and out of the computational instance), the extent that its infrastructure is shared with other instances (e.g., how many other computational instances share the infrastructure), contractual factors related to the enterprise served by the computational instance (e.g., there is a contractual clause in the agreement between the enterprise and the data center operator that indicates that the enterprise's computational instances are to be given priority during automations), and so on may be taken into account when computational instances are placed in batches and a schedule is generated for these batches.

For instance, there may be a pre-defined limit to the number of nodes, number of application nodes, and/or number of database nodes that can be in a batch. Alternatively or additionally, there may be a pre-defined limit to the amount of traffic associated with computational instances that can be in a batch. Other factors may be taken into account.

This pre-scheduling has the advantage of eliminating the need to determine, at the time that the automations are to take place, how to schedule these automations. For example, a batching algorithm may be carried out once per day during a low-load period of time. When automatons are triggered, for example in the failover scenario discussed above, the schedule is followed. This avoids having to subject a central instance, which may already be under heavy load due to the failover scenario, to the additional load associated with generating the schedule.

For purposes of illustration in the examples below, it will be assumed that automations are scheduled by batching computational instances, each containing some number of application and database nodes, and that each database node is of a respective size (in terms of storage). To that point, FIG. 8A is an alternative representation of data center 700, with elements relabeled for convenience.

Server devices and computational instances 800 represents the server devices and computational instances of data center 700 in a series of lists, one per server device. The server devices are labelled with different reference numerals for convenience, but these have a one-to-one mapping with the server devices of data center 700. For example, SD1 corresponds to server device 720, SD2 corresponds to server device 722, SD3 corresponds to server device 724, and so on. Further, computational instance y hosted by server device x is represented in the format INx-y. Thus, for example, the 6 computational instances hosted by SD5 (server device 728) are labelled as IN5-1 . . . IN5-6.

The curly brace delimiters ("{" and "}") in FIG. 8A and the following figures indicate that the items therebetween are in a list. Such a list may be a specific type of data structure in certain programming languages such as JAVA®. But other data structures, such as custom linked lists or arrays may be used instead.

Pods 802 represent the pods in data center 700 in a series of lists, one per pod. The pods are labelled with different reference numerals for convenience, but these have a one-to-one mapping with the pods of data center 700. For example, POD1 corresponds to pod 702, POD2 corresponds to pod 704, and POD3 corresponds to pod 706. As shown in FIG. 7, each pod contains some number of server devices which, in turn, each host some number of computational instances. POD1, POD2, and POD3 respectively represent their server devices and the computational instances hosted thereby with list of lists data structures. Thus, for example, POD2 is represented by a list of 5 lists, the 5 lists respectively containing computational instances for SD4, SD5, SD6, SD7, and SD8.

All pods in data center 804 represents the pods in data center 700 in a list format. Thus, it consists of POD1, POD2, and POD3.

FIG. 8B depicts pseudocode 810 of an algorithm for arranging computational instances into batches for automations. Pseudocode 810 specifies the algorithm with some annotative text, for purpose of illustration, and can be implemented in various programming languages in various ways.

In order to better understand the algorithm represented by pseudocode 810, an example is shown in FIGS. 8C-8E for data center 700. Thus, pseudocode 810 is not described in detail on its own, but is suitably illustrated by the example. Nonetheless, it is helpful to understand that pseudocode 810 can be thought of as having three roughly-defined phases, each following comments that introduce each phase (the comments are the lines in pseudocode 810 that being with double forward slashes).

The first phase, represented by lines 1-4.2.4, focuses on gathering data on the arrangement of pods, server devices, and computational instances in the data center. In particular, the computational instances are placed in a list of lists and ordered by server device according to one or more sorting criteria. The second phase, represented by lines 4.3-4.5.2, focuses on assigning groups of computational instances to batches in a fashion that spreads the load per batch across pods and server devices. The third phase, represented by lines 4.6-4.8, focuses on assigning any remaining unassigned computational instances to batches in a similar fashion. By the end of the third phase, all computational instances are assigned to a batch such that automating operations on a per-batch basis can be accomplished without placing an undue computational, storage, or communicative burden on data center 700. The aforementioned messaging protocols may be used for inter-process, inter-node, and/or inter-device communication to support the operations of these phases.

Starting in the first phase, step 1 of pseudocode 810 involves determining the number of computational instances per batch and assigning this number to the variable M. In various embodiments, M may take on values such as 5, 10, 25, 50, 80, 100, and so on. For purposes of this example, it is assumed that M=15.

Step 2 involves initiating the variable BatchList to be an empty list of lists. Eventually, BatchList will have a list for each batch, each of these lists containing computational instances assigned to the respective batch.

Step 3 involves setting the variable LB to point or refer to the current batch within BatchList. Thus, LB initially points to an empty list at the beginning of BatchList.

Step 4 defines a block of pseudocode 810 (containing steps 4.1-4.8) that is executed once per data center. Since the current example is limited to a single data center for purposes of simplicity, this block is executed just once.

Step 4.1 involves defining the variable AP to be a list of all pods in the current data center. For data center 700, AP is shown in FIG. 8A to be the list {POD1, POD2, POD3}.

Step 4.2 defines a sub-block of pseudocode 810 (containing steps 4.2.1-4.2.4) that is executed once per pod. Thus, in the example of data center 700, it is executed three times, once for POD1 (pod 702), once for POD2 (pod 704), and once for POD3 (pod 706). The data structures after the execution of each step within this sub-block are shown in FIG. 8C for each pod.

Step 4.2.1 involves setting the variable DS to contain a list of all server devices for the current pod represented as lists of the instances therein. As an example, for POD1, DS is the list of lists {{IN1-1, IN1-2, IN1-3, IN1-4, IN1-5, IN1-6, IN1-7, IN1-8, IN1-9}, {IN2-1, IN2-2, IN2-3, IN2-4, IN2-5, IN2-6}, {IN3-1, IN3-2}}.

Step 4.2.2 involves sorting DS in descending order of by the number of computational instances per server device. For POD1, DS is already sorted in this fashion, so DS need not be rearranged. In general, other sorting criteria can be used, such as database size per computational instance, network traffic per computational instance, the contractual importance of each computational instance, and so on.

Step 4.2.3 involves setting IP to be the list of all computational instances in DS after sorting. Thus, for POD1, IP is {IN1-1, IN1-2, IN1-3, IN1-4, IN1-5, IN1-6, IN1-7, IN1-8, IN1-9, IN2-1, IN2-2, IN2-3, IN2-4, IN2-5, IN2-6, IN3-1, IN3-2}. In other words, IP is DS flattened to be a single list.

Step 4.2.4 involves appending IP in list form to the end of LP. LP is a list of all computational instances in the data center organized by pod. Before the first iteration of this sub-block, LP is the empty list. After the first iteration completes, LP is {{IN1-1, IN1-2, IN1-3, IN1-4, IN1-5, IN1-6, IN1-7, IN1-8, IN1-9, IN2-1, IN2-2, IN2-3, IN2-4, IN2-5, IN2-6, IN3-1, IN3-2}}.

This process of step 4.2 repeats for POD2 and POD3. For POD2, the sorted DS is {{IN4-1, IN4-2, IN4-3, IN4-4, IN4-5, IN4-6, IN4-7, IN4-8}, {IN7-1, IN7-2, IN7-3, IN7-4, IN7-5, IN7-6, IN7-7}, {IN5-1, IN5-2, IN5-3, IN5-4, IN5-5, IN5-6}, {IN8-1, IN8-2, IN8-3, IN8-4}, {IN6-1}}, IP is {IN4-1, IN4-2, IN4-3, IN4-4, IN4-5, IN4-6, IN4-7, IN4-8, IN7-1, IN7-2, IN7-3, IN7-4, IN7-5, IN7-6, IN7-7, IN5-1, IN5-2, IN5-3, IN5-4, IN5-5, IN5-6, IN8-1, IN8-2, IN8-3, IN8-4, IN6-1}, and LP becomes {{IN1-1, IN1-2, IN1-3, IN1-4, IN1-5, IN1-6, IN1-7, IN1-8, IN1-9, IN2-1, IN2-2, IN2-3, IN2-4, IN2-5, IN2-6, IN3-1, IN3-2}, {IN4-1, IN4-2, IN4-3, IN4-4, IN4-5, IN4-6, IN4-7, IN4-8, IN7-1, IN7-2, IN7-3, IN7-4, IN7-5, IN7-6, IN7-7, IN5-1, IN5-2, IN5-3, IN5-4, IN5-5, IN5-6, IN8-1, IN8-2, IN8-3, IN8-4, IN6-1}}.

For POD3, the sorted DS is {{IN9-1, IN9-2, IN9-3, IN9-4, IN9-5, IN9-6, IN9-7, IN9-8, IN9-9}, {IN10-1, IN10-2, IN10-3, IN10-4, IN10-5, IN10-6, IN10-7, IN10-8, IN10-9}}, IP is {IN9-1, IN9-2, IN9-3, IN9-4, IN9-5, IN9-6, IN9-7, IN9-8, IN9-9, IN10-1, IN10-2, IN10-3, IN10-4, IN10-5, IN10-6, IN10-7, IN10-8, IN10-9}, and LP becomes {{IN1-1, IN1-2, IN1-3, IN1-4, IN1-5, IN1-6, IN1-7, IN1-8, IN1-9, IN2-1, IN2-2, IN2-3, IN2-4, IN2-5, IN2-6, IN3-1, IN3-2}, {IN4-1, IN4-2, IN4-3, IN4-4, IN4-5, IN4-6, IN4-7, IN4-8, IN7-1, IN7-2, IN7-3, IN7-4, IN7-5, IN7-6, IN7-7, IN5-1, IN5-2, IN5-3, IN5-4, IN5-5, IN5-6, IN8-1, IN8-2, IN8-3, IN8-4, IN6-1}, {IN9-1, IN9-2, IN9-3, IN9-4, IN9-5, IN9-6, IN9-7, IN9-8, IN9-9, IN10-1, IN10-2, IN10-3, IN10-4, IN10-5, IN10-6, IN10-7, IN10-8, IN10-9}}.

The second phase begins at step 4.3, and involves sorting LP in descending order by the size of IP for each pod. Thus, as shown in FIG. 8C, LP is rearranged to be {{IN4-1, IN4-2, IN4-3, IN4-4, IN4-5, IN4-6, IN4-7, IN4-8, IN7-1, IN7-2, IN7-3, IN7-4, IN7-5, IN7-6, IN7-7, IN5-1, IN5-2, IN5-3, IN5-4, IN5-5, IN5-6, IN8-1, IN8-2, IN8-3, IN8-4, IN6-1}, {IN9-1, IN9-2, IN9-3, IN9-4, IN9-5, IN9-6, IN9-7, IN9-8, IN9-9, IN10-1, IN10-2, IN10-3, IN10-4, IN10-5, IN10-6, IN10-7, IN10-8, IN10-9}, {IN1-1, IN1-2, IN1-3, IN1-4, IN1-5, IN1-6, IN1-7, IN1-8, IN1-9, IN2-1, IN2-2, IN2-3, IN2-4, IN2-5, IN2-6, IN3-1, IN3-2}}. Notably, POD2 is the largest in terms of computational instances (26), so its list appears first, followed by POD3 (18) and POD1 (17). Other sorting criteria may be used, such as such as database size per computational instance, network traffic per computational instance, the contractual importance of each computational instance, and so on.

Step 4.4 involves determining the number of computational instances to place into BatchList at a time during the second phase. This is referred to as N, and is set to be 5. Notably, the len( ) operation returns the length of a list, and len(LB) is 0 at this point, because LB initially points to an empty list in BatchList.

Step 4.5 largely consists of a sub-block of pseudocode 810 that involves the assigning of N computational instances per pod from LP to BatchList until no such group of N computational instances is left in LP. Data structures for these operations of the second phase are shown in FIG. 8D. In the example shown, steps 4.5.1 and 4.5.2 are executed several times for each pod.

Step 4.5.1 involves removing the first N computational instances from the current pod's list in LP, and adding these to the current batch (as referred to by LB) in BatchList. Step 4.5.2 involves checking whether the length of LB is M. If so, the current batch, LB, is full to the pre-determined maximum batch size M, and a new batch is created in BatchList. LB is changed to refer to this new batch (thus, LB always refers to the current batch in BatchList to which computational instances can be added).

For POD1, step 4.5.1 involves moving computational instances IN1-1, IN1-2, IN1-3, IN1-4, and IN1-5 from LP to LB. Similarly, for POD2 this step involves moving computational instances IN4-1, IN4-2, IN4-3, IN4-4, and IN4-5, while for POD3 this step involves moving computational instances IN9-1, IN9-2, IN9-3, IN9-4, and IN9-5.

Thus, at the end of this first iteration, BatchList={{IN1-1, IN1-2, IN1-3, IN1-4, IN1-5, IN4-1, IN4-2, IN4-3, IN4-4, IN4-5, IN9-1, IN9-2, IN9-3, IN9-4, IN9-5}}. Since the length of LB is M at this point, a new batch is initiated in BatchList by creating a second list (which is empty), and pointing LB to that list.

After the second iteration, computational instances IN1-6, IN1-7, IN1-8, IN1-9, IN2-1 from POD1, IN4-6, IN4-7, IN4-8, IN7-1, IN7-2 from POD2, and IN9-6, IN9-7, IN9-8, IN9-9, IN10-1 from POD3 are moved to the second batch in BatchList. Since the length of LB is once again M at this point, a new batch is initiated in BatchList by creating a third list (also empty), and pointing LB to that list.

After the third iteration, computational instances IN2-2, IN2-3, IN2-4, IN2-5, IN2-6 from POD1, IN7-3, IN7-4, IN7-5, IN7-6, IN7-7 from POD2, and IN10-2, IN10-3, IN10-4, IN10-5, IN10-6 from POD3 are moved to the third batch in BatchList. Since the length of LB is once again M at this point, a new batch is initiated in BatchList by creating a fourth list (also empty), and pointing LB to that list.

For the fourth iteration, the only list in LP with N computational instances remaining is the one associated with POD2. Accordingly, no computational instances from POD1 or POD3 are moved. After the fourth iteration, computational instances IN5-1, IN5-2, IN5-3, IN5-4, IN5-5, IN5-6, IN8-1, IN8-2, IN8-3, IN8-4 are moved to the fourth batch in BatchList.

This leaves LP as {{IN6-1}, {IN10-7, IN10-8, IN10-9}, {IN3-1, IN3-2}}. Since no more groups of N computational instances within any pod can be moved at this point, the second phase ends.

The third phase involves setting N to be 1 at step 4.6. This results in the remaining computational instances being moved one by one to BatchList. This occurs in step 4.7, 4.7.1, and 4.7.1, which otherwise resemble steps 4.5, 4.5.1, and 4.5.2, respectively.

Data structures for these operations of the third phase are shown in FIG. 8E. Notably, after the first iteration of this phase, computational instances IN3-1, IN6-1, IN10-7, IN10-8, and IN10-9, are moved to the fourth batch in BatchList. Since the length of LB is once again M at this point, a new batch is initiated in BatchList by creating a fifth list (also empty), and pointing LB to that list.

For the second iteration, only computational instance IN3-2 remains in LP. Thus, this computational instance is moved to the fifth list in BatchList. After that, LP is empty, and all of the computational instances in data center 700 have been assigned to batches. Notably, computational instances from all three pods are roughly balanced (when possible) across the batches.

Step 4.8 involves assigning any remaining unassigned computational instances to BatchList.

Thus, automations can be scheduled in data center 700 on a batch by batch basis without a significant burden on any one computational instance. For example, once automations for the first batch begin, no other automations are permitted to begin until all automations (or a threshold number of automations) from the first batch complete. Then automations from the second batch begin, and so on. Alternatively, automations may be scheduled to begin at fixed intervals, such as once every 10, 15, 30, or 60 minutes, regardless of whether any previously scheduled automations have completed. Regardless, this scheduling spreads out the execution of automations in time, which also reduces the load on central instances.

Figure 8F:
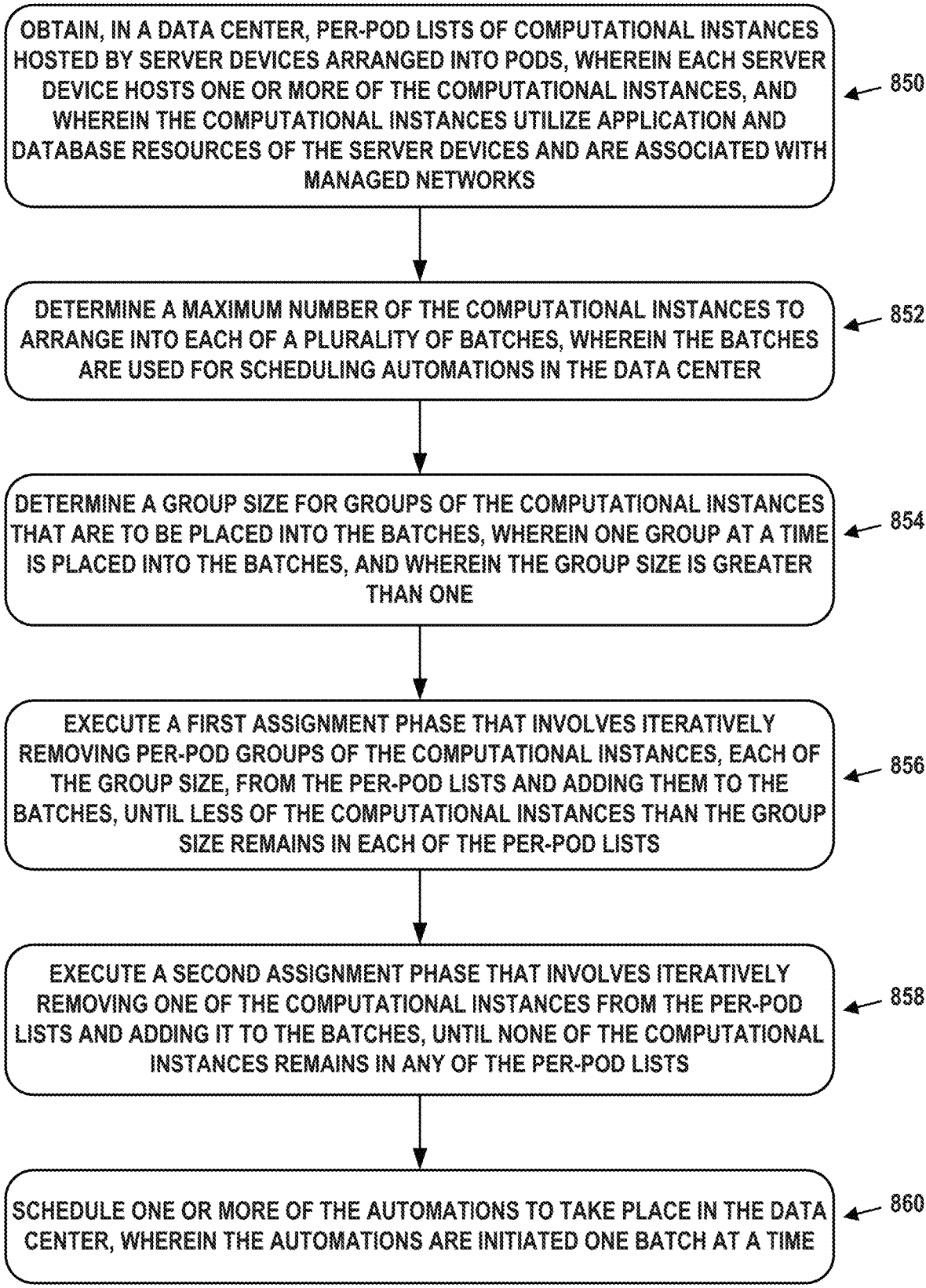
FIG. 8F is a flow chart, in accordance with example embodiments.

FIG. 8F is a flow chart illustrating an embodiment in line with these examples. The process illustrated by FIG. 8F may be carried out by one or more computing device of a data center, such as computing device 100, and/or a cluster of computing devices, such as server cluster 200. However, the process can be carried out by other types of devices or device subsystems, such as a central instance of a remote network management platform.

The embodiments of FIG. 8F may be simplified by the removal of any one or more of the features shown therein. Further, these embodiments may be combined with features, aspects, and/or implementations of any of the previous figures or otherwise described herein.

Block 850 may involve obtaining, in a data center, per-pod lists of computational instances hosted by server devices arranged into pods, where each server device hosts one or more of the computational instances, and where the computational instances utilize application and database resources of the server devices and are associated with managed networks.

Block 852 may involve determining a maximum number of the computational instances to arrange into each of a plurality of batches, where the batches are used for scheduling automations in the data center.

Block 854 may involve determining a group size for groups of the computational instances that are to be placed into the batches, where one group at a time is placed into the batches, and where the group size is greater than one.

Block 856 may involve executing a first assignment phase that involves iteratively removing per-pod groups of the computational instances, each of the group size, from the per-pod lists and adding them to the batches, until less of the computational instances than the group size remains in each of the per-pod lists.

Block 858 may involve executing a second assignment phase that involves iteratively removing one of the computational instances from the per-pod lists and adding it to the batches, until none of the computational instances remains in any of the per-pod lists.

Block 860 may involve scheduling one or more of the automations to take place in the data center, where the automations are initiated one batch at a time.

In some embodiments, there are fewer pods than server devices.

In some embodiments, prior to executing the first assignment phase, the per-pod lists are each sorted, per server device, in descending order of the computational instances therein.

In some embodiments, prior to executing the first assignment phase, the per-pod lists are each sorted, per server device, in descending order of network traffic involving the computational instances therein.

In some embodiments, prior to executing the first assignment phase, the per-pod lists are each sorted, per server device, in descending order of service-level agreement (e.g., contract) importance of the computational instances therein.

In some embodiments, the maximum number is predetermined, and is at least 2.

In some embodiments, the group size is based on the maximum number divided by a count of the pods.

In some embodiments, adding the per-pod groups of the computational instances to the batches comprises adding up to the maximum number of computational instances in each batch, then creating a new batch for addition of further computational instances.

In some embodiments, scheduling one or more of the automations to take place in the data center comprises scheduling all of the automations involving a first of the batches to take place prior to any of the automations involving a second of the batches.

In some embodiments, scheduling all of the automations involving the first of the batches to take place prior to any of the automations involving the second of the batches comprises: (i) scheduling all of the automations involving the first of the batches to take place substantially simultaneously; and (ii) waiting for all of the automations involving the first of the batches to complete prior to initiating any of the automations involving the second of the batches. Here, substantially simultaneously may refer to the automations starting at the same time and/or overlapping in execution to any extent, but not necessarily ending at the same time.

In some embodiments, scheduling all of the automations involving the first of the batches to take place prior to any of the automations involving the second of the batches comprises: (i) scheduling all of the automations involving the first of the batches to take place substantially simultaneously; and (ii) scheduling the automations of the second of the batches to begin at a fixed interval after the automations of the first of the batches begin.

VII. Example Scheduling of Application Node Initiations

As a further example of automation scheduling in order to regulate load on data center infrastructure, steps taken by data centers that are targets of failovers may be proceed in a measured fashion. As noted previously, a computational instance may fail over from a source (active) data center to a target (standby) data center, and these failovers may take place automatically or be manually triggered. Such an automation has steps that execute on both the source data center and the target data center.

The embodiments herein facilitate executing at least some of the steps to be performed by the target data center in a fashion that reduces the load being introduced to the infrastructure therein. In particular, when initiating application nodes in a computational instance at the target data center, the capacity of each server device involved in doing so may be taken into account so that the likelihood that server devices become overloaded is reduced. Nonetheless, these embodiments also ensure that a pre-defined percentage of the total number of application nodes is initiated with high priority so that the computational instance is able to begin serving its managed network in an expeditious fashion.

As one of a number of steps, failover procedures may replicate the database nodes from the source data center to the target data center. While some amount of replication may be taking place between these database nodes during normal operation (e.g., a database node from the source data center may transmit updates to a corresponding database node at the target data center in real time or periodically), during failover, a final synchronization of the database nodes may occur. Once the database nodes in the target data center are fully synchronized, the application node configuration may be updated to refer to the database nodes of the target data center. Then this configuration may be applied to the target data center. Thus, one or more application nodes may be assigned to one or more server devices, with these application nodes configured to use database nodes in the target data center. In order to obtain the new configuration, the application nodes may need to be initialized or restarted.

Initiating application nodes may be a resource intensive process. The server device (which may be a physical device or a virtual machine) that is to execute an application node may have to obtain the application node's executable image and configuration data, install the image and configuration data in the appropriate location on the server device, and launch (execute) the application node. Before a launched application node is fully functional, it may read the configuration data, allocate memory, set up internal data structures, and so on. This may tax both the processing and memory capabilities of the server device, especially since the server device may be simultaneously executing application nodes from other computational instances and performing other automations.

Accordingly, a failover automation may provide ways of initiating application nodes in a controlled fashion and based on the respective capacities of their server devices. Particularly, the automation may have a pre-configured variable that defines the minimal number or percentage of application nodes that are to be initiated with high priority regardless of server device capacity. The remaining application nodes may be initiated at a lower priority. For example, if the automation is configured so that at least 50% of the application nodes are to be initiated with high priority, then the automation will perform accordingly.

In some cases, application nodes may not need to be fully initialized and instead are just restarted. These restart procedures (which may also be referred to as initialization) can still be expensive in terms of computation and memory utilization. Thus application node restarts may be scheduled in the same fashion as application node initializations.

Figure 9A:
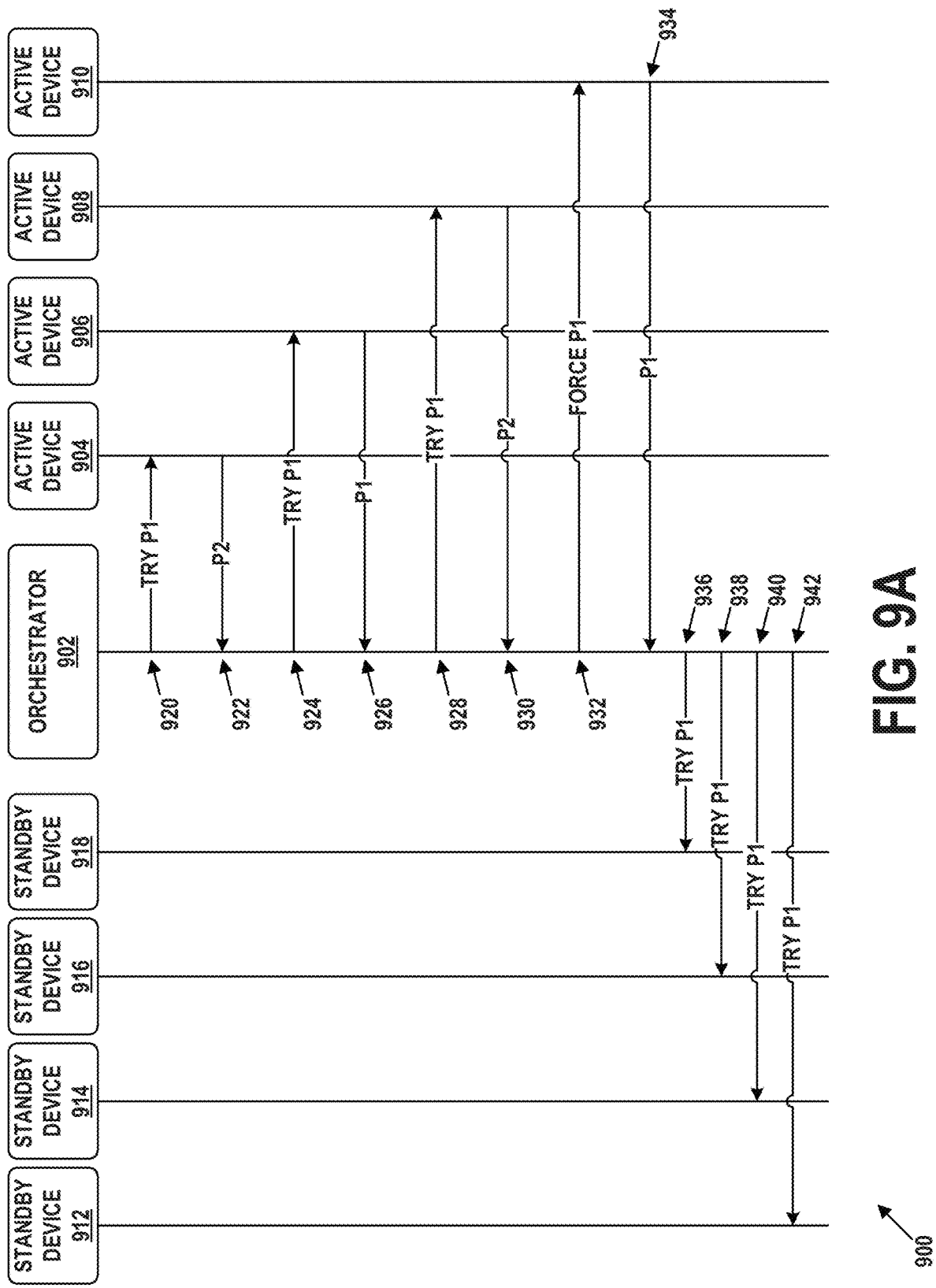
FIG. 9A is a message flow diagram, in accordance with example embodiments.

This procedure is illustrated in FIG. 9A. This figure depicts an arrangement 900—disposed within a data center—of orchestrator 902 and server devices. As was the case above, each server device in FIG. 9A may be a physical server or a virtual machine. The server devices are divided into active server devices 904, 906, 908, and 910, as well as standby server devices 912, 914, 916, and 918. Orchestrator 902 may be distinct from all computational instances that serve managed networks (e.g., orchestrator 902 may execute on the central instance). Alternatively, a copy of orchestrator 902 may be included in each computational instance.

Arrangement 900 reflects a possible data center architecture in which active server devices 904, 906, 908, and 910 carry out computational instance functionality for one or more computational instances, and standby server devices 912, 914, 916, and 918 are idle by default. If one of active server devices 904, 906, 908, and 910 fails or is experiencing problems, one of standby server devices 912, 914, 916, and 918 can take over its role. While FIG. 9A depicts an equal number of active server devices and standby server devices, this need not be the case.

Note that the standby server devices provide intra-data-center redundancy, whereas data center failover provides inter-data-center redundancy. Thus, the term "failover" may be overloaded to refer to moving a computational instance between data centers, as well as moving functionality within a computational instance between two server devices.

In FIG. 9A, it is assumed that the application nodes of a computational instance are being failed over (using inter-data-center redundancy) to active server devices 904, 906, 908, and 910, one application node per device. But, in general, any number of application nodes per server device may be configured. It is further assumed that each active and standby server device has a daemon executing thereon that measures the utilization and health of the server device and handles the exchange of messaging with other devices. The utilization of a server device may take into account processor utilization, memory utilization, and/or communication utilization. The health of a server device may take into account whether the server device is carrying out certain tasks properly. For example, numerous errors in log files may indicate that the server device is not healthy.

In order to schedule application node initializations, each server device may implement two queues—a high priority (P1) queue and a lower priority (P2) queue. When orchestrator 902 makes requests to a server device, the server device's daemon places the request in either the P1 or P2 queue. The daemon (or another process or program) may read from these queues such that the P1 queue has priority over the P2 queue.

In some implementations, the P1 queue may have strict priority over the P2 queue (e.g., the daemon serves the P1 queue until it is empty, then serves the P2 queue until a request arrives in the P1 queue). In other implementations, the daemon may serve the P1 queue more frequently than the P2 queue (e.g., the daemon serves up to 2 requests on the P1 queue for every request it serves on the P2 queue). Other priority mechanisms may be used. Under any of these implementations, queues that are empty may be skipped. For example, the daemon may continue serve the P2 queue if the P1 queue is empty, and vice versa.

When a request is removed from either queue, it may be provided to a worker thread for execution. Each computing device may maintain a pool of such worker threads (e.g., 8, 16, etc.) that are configured to be able to carry out tasks specified by the queued requests.

When initiating application nodes, orchestrator 902 could place all initiation requests in the P1 queues of the applicable server devices. But doing so may result in these server devices being overloaded. As discussed above, if a server device is already subject to high utilization or poor health, it may be beneficial to place the application node initiation request in the P2 queue instead of the P1 queue, in order to give the server device an opportunity to recover before initiating the application node.

In order to facilitate this mechanism, the daemon on each server device may periodically or from time to time measure the processor utilization, memory utilization, communication capacity utilization, and/or health of the server device. If any of these factors exceeds a respective predetermined threshold (e.g., 80% processor utilization, 70% memory utilization, 50% communication capacity utilization, or a threshold extent of poor health) the daemon may place incoming requests on the P2 queue instead of the P1 queue. In some cases, a server device may be determined to have poor health when a log file associated with one or more applications executing thereon includes more than x errors logged in the last y seconds, for example.

On the other hand, and as noted above, orchestrator 902 may be configured so that a pre-defined percentage of the total number of application nodes is initiated with high priority (e.g., their initiation requests are placed in P1 queues). Balancing these two goals (server device load and the desire for application nodes to be rapidly initiated) is addressed by the following messaging protocol.

Orchestrator 902 may make two types of requests to a daemon, try P1 and force P1. A try P1 request asks the daemon to place the request in its P1 queue, but indicates that it would be acceptable for the daemon to place the request in its P2 queue instead. A force P1 request requires that the daemon place the request in its P1 queue. By dynamically adjusting the type of request sent to daemons based on feedback from the daemons, orchestrator 902 can achieve a reasonable balance of the two goals.

Accordingly, orchestrator 902 may iteratively transmit application node initiation requests to server devices per the following protocol. In this description, n refers to the total number of application nodes to initiate and m refers to the minimum number of application nodes that are to be initiated using a P1 queue, where $m \leq n$. Thus, $m/n \geq p$, where p is the given percentage of nodes that are to be initiated using a P1 queue. Further, i refers to the current number of nodes initiated using a P1 queue, and j refers to the current number of nodes initiated using a P2 queue, where $i+j \leq n$. Notably, the relationship $j \leq n-m$ must hold for the goal of initiating at least m application nodes using a P1 queue to be achieved.

Thus, orchestrator 902 transmits a force P1 request only when $i < m$ and $j = n-m$. In all other situations, orchestrator 902 transmits a try P1 request.

In FIG. 9A, it is assumed that $n=4$ and $m=2$. Thus, 50% of the application nodes are to be initiated using the P1 queue. At step 920, $i=0$ and $j=0$. As j is not equal to $n-m$, orchestrator 902 transmits a try P1 request to server device 904. At step 922, server device 904 responds with an indication that this request was placed in its P2 queue.

At step 924, $i=0$ and $j=1$. As j is not equal to $n-m$, orchestrator 902 transmits a try P1 request to server device 906. At step 926, server device 906 responds with an indication that this request was placed in its P1 queue.

At step 928, $i=1$ and $j=1$. As j is not equal to $n-m$, orchestrator 902 transmits a try P1 request to server device 908. At step 930, server device 908 responds with an indication that this request was placed in its P2 queue.

At step 932, $i=1$ and $j=2$. As $i < m$ and j is equal to $n-m$, orchestrator 902 transmits a force P1 request to server device 910. At step 934, server device 910 responds with an indication that this request was placed in its P1 queue.

At this point, the goal of 50% of the application nodes being initiated using the P1 queue is achieved. At steps 936, 938, 940, and 942, orchestrator 902 transmits try P1 application node initiation requests to server devices 912, 914, 916, and 918. Since these are standby devices, orchestrator 902 does request that for any application nodes are initiated using the P1 queue.

Note that in some embodiments there may be k such orchestrators, each having n application nodes to be initiated. For maximum redundancy, all application nodes of a computational instance may be on different server devices (n server devices). So, there can be a total k×n application nodes on n server devices under this distribution of application nodes. There may be a p percentage of k application nodes on each server device that are initiated by way of the P1 queue, with the remaining initiated by way of the P2 queue. A server device only allocates high priority resources to p percentage of the orchestrators. The remaining orchestrators that are given lower priority obtain high priority on other server devices. This way, each orchestrator is prioritized on at least p×n of the server devices.

FIG. 9B is a flow chart illustrating an embodiment in line with these examples. The process illustrated by FIG. 9B may be carried out by one or more computing device of a data center, such as computing device 100, and/or a cluster of computing devices, such as server cluster 200. However, the process can be carried out by other types of devices or device subsystems, such as a central instance of a remote network management platform.

The embodiments of FIG. 9B may be simplified by the removal of any one or more of the features shown therein.

Further, these embodiments may be combined with features, aspects, and/or implementations of any of the previous figures or otherwise described herein.

Block 950 may involve determining, by an orchestration application, that a total number of application nodes are to be initiated on a plurality of server devices. The server devices may contain: (i) high priority queues for incoming requests, one per each of the server devices, and (ii) low priority queues for the incoming requests, one per each of the server devices. Also, the server devices may be configured to execute background processes (e.g., daemons) that serve the incoming requests on the high priority queues with preference over the incoming requests on the low priority queues.

Block 952 may involve obtaining, by the orchestration application, a minimum number of the application nodes are to be initiated by way of the high priority queues.

Block 954 may involve iteratively transmitting, by the orchestration application, requests for initiation of the application nodes until initiation has been requested for the total number of application nodes. The requests may include first instructions to force background processes to initiate application nodes by way of the high priority queues when: (i) a first count of application nodes initiated to this point by way of the high priority queues is less than the minimum number, and (ii) a second count of application nodes initiated to this point by way of the low priority queues is less than or equal to the total number minus the minimum number. The requests may include second instructions that allow the background processes to initiate application nodes by way of either the high priority queues or the low priority queues in all other cases.

In some embodiments, the total number is equal to a count of the server devices.

In some embodiments, the background processes measure utilizations of the server devices and determine whether to place the requests in the high priority queues or the low priority queues based on the utilizations. The utilizations may be one or more of processor utilizations, memory utilizations, or communication capacity utilizations.

In some embodiments, the background processes measure health characterizations of the server devices and determine whether to place the requests in the high priority queues or the low priority queues based on the health characterizations. The health characterizations may be based at least in part on error messages logged by software executing on the server devices.

In some embodiments, the background processes transmit, to the orchestration application, an indication of whether requests were placed in the high priority queues or the low priority queues. The orchestration application may uses these indications to determine whether to instruct server devices that subsequent requests are to be served by the high priority queues or the low priority queues.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A data center comprising:
   a plurality of server devices arranged into pods, the plurality of server devices hosting computational instances, wherein the computational instances utilize application and database resources of the plurality of server devices and are associated with managed networks; and
   a central computational instance, operational on one or more computing devices, and configured to:
   obtain per-pod lists of the computational instances hosted by the plurality of server devices of the pods;
   determine a maximum number of the computational instances to arrange into each of a plurality of batches, wherein the batches are used for scheduling automations in the data center;
   determine a group size for groups of the computational instances that are to be placed into the batches, wherein one group at a time is placed into the batches, and wherein the group size is greater than one;
   execute a first assignment phase that involves iteratively removing per-pod groups of the computational instances, each of the group size, from the per-pod lists and adding them to the batches, until less of the computational instances than the group size remains in each of the per-pod lists;
   execute a second assignment phase that involves iteratively removing one of the computational instances from the per-pod lists and adding it to the batches, until none of the computational instances remains in any of the per-pod lists;
   schedule one or more automations of the automations to take place in the data center, wherein the automations are initiated one batch at a time; and
   execute the one or more automations scheduled to take place in the data center, wherein the one or more automations comprise restarting an application node, restoring a database node, failing a computational instance of the computational instances over to another data center, moving the computational instance over to the other data center, or upgrading the computational instance, or any combination thereof.

2. The data center of claim 1, wherein there are fewer pods than the plurality of server devices.

3. The data center of claim 1, wherein, prior to executing the first assignment phase, the per-pod lists are each sorted, per server device, in descending order of the computational instances therein.

4. The data center of claim 1, wherein, prior to executing the first assignment phase, the per-pod lists are each sorted, per server device, in descending order of network traffic involving the computational instances therein.

5. The data center of claim 1, wherein, prior to executing the first assignment phase, the per-pod lists are each sorted, per server device, in descending order of service-level agreement importance of the computational instances therein.

6. The data center of claim 1, wherein the maximum number is pre-determined.

7. The data center of claim 1, wherein the group size is based on the maximum number divided by a count of the pods.

8. The data center of claim 1, wherein adding the per-pod groups of the computational instances to the batches comprises adding up to the maximum number of the computational instances in each batch, then creating a new batch for addition of further computational instances.

9. The data center of claim 1, wherein scheduling the one or more automations to take place in the data center comprises scheduling all of the automations involving a first of the batches to take place prior to any of the automations involving a second of the batches.

10. The data center of claim 9, wherein scheduling all of the automations involving the first of the batches to take place prior to any of the automations involving the second of the batches comprises:
    scheduling all of the automations involving the first of the batches to take place substantially simultaneously; and
    waiting for all of the automations involving the first of the batches to complete prior to initiating any of the automations involving the second of the batches.

11. The data center of claim 9, wherein scheduling all of the automations involving the first of the batches to take place prior to any of the automations involving the second of the batches comprises:
    scheduling all of the automations involving the first of the batches to take place substantially simultaneously; and
    scheduling the automations of the second of the batches to begin at a fixed interval after the automations of the first of the batches begin.

12. A computer-implemented method comprising:
    obtaining, in a data center, per-pod lists of computational instances hosted by server devices arranged into pods, wherein the server devices host the computational instances, and wherein the computational instances utilize application and database resources of the server devices and are associated with managed networks;
    determining a maximum number of the computational instances to arrange into each of a plurality of batches, wherein the batches are used for scheduling automations in the data center;
    determining a group size for groups of the computational instances that are to be placed into the batches, wherein one group at a time is placed into the batches, and wherein the group size is greater than one;
    executing a first assignment phase that involves iteratively removing per-pod groups of the computational instances, each of the group size, from the per-pod lists and adding them to the batches, until less of the computational instances than the group size remains in each of the per-pod lists;
    executing a second assignment phase that involves iteratively removing one of the computational instances from the per-pod lists and adding it to the batches, until none of the computational instances remains in any of the per-pod lists;
    scheduling one or more automations of the automations to take place in the data center, wherein the automations are initiated one batch at a time; and
    executing the one or more automations scheduled to take place in the data center, wherein the one or more automations comprise restarting an application node, restoring a database node, failing a computational instance of the computational instances over to another data center, moving the computational instance over to the other data center, or upgrading the computational instance, or any combination thereof.

13. The computer-implemented method of claim 12, wherein, prior to executing the first assignment phase, the per-pod lists are each sorted, per server device, in descending order of the computational instances therein.

14. One or more non-transitory computer-readable medium comprising computer readable instructions, that when executed by one or more processors, cause the one or more processors to perform operations comprising:

obtaining, via a central instance operational on one or more computing devices, per-pod lists of computational instances hosted by respective server devices of a plurality of server devices arranged into pods, each respective server device hosting one or more computational instances, wherein the computational instances utilize application and database resources of the server devices and are associated with managed networks;

determining, via the central instance, a maximum number of the computational instances to arrange into each of a plurality of batches, wherein the batches are used for scheduling automations in a data center;

determining, via the central instance, a group size for groups of the computational instances that are to be placed into the batches, wherein one group at a time is placed into the batches, and wherein the group size is greater than one;

executing, via the central instance, a first assignment phase that involves iteratively removing per-pod groups of the computational instances, each of the group size, from the per-pod lists and adding them to the batches, until less of the computational instances than the group size remains in each of the per-pod lists;

executing, via the central instance, a second assignment phase that involves iteratively removing one of the computational instances from the per-pod lists and adding it to the batches, until none of the computational instances remains in any of the per-pod lists; and scheduling, via the central instance, one or more automations of the automations to take place in the data center, wherein the automations are initiated one batch at a time; and executing, via the central instance, the one or more automations scheduled to take place in the data center, wherein the one or more automations comprise restarting an application node, restoring a database node, failing a computational instance of the computational instances over to another data center, moving the computational instance over to the other data center, or upgrading the computational instance, or any combination thereof.

15. The one or more non-transitory computer-readable medium of claim 14, wherein the operations comprise, prior to executing the first assignment phase, sorting the per-pod lists, per server device, in descending order of the computational instances therein.

16. The one or more non-transitory computer-readable medium of claim 14, wherein the operations comprise, prior to executing the first assignment phase, sorting the per-pod lists, per server device, in descending order of network traffic involving the computational instances therein.

17. The one or more non-transitory computer-readable medium of claim 14, wherein the operations comprise, prior to executing the first assignment phase, sorting the per-pod lists, per server device, in descending order of service-level agreement importance of the computational instances therein.

18. The one or more non-transitory computer-readable medium of claim 14, wherein adding the per-pod groups of the computational instances to the batches comprises:

adding up to the maximum number of the computational instances in each batch;

and creating a new batch for addition of further computational instances.

19. The one or more non-transitory computer-readable medium of claim 14, wherein scheduling the one or more of the automations to take place in the data center comprises scheduling all of the automations involving a first of the batches to take place prior to any of the automations involving a second of the batches.

20. The one or more non-transitory computer-readable medium of claim 19, wherein scheduling all of the automations involving the first of the batches to take place prior to any of the automations involving the second of the batches comprises:

scheduling all of the automations involving the first of the batches to take place substantially simultaneously; and scheduling the automations of the second of the batches to begin at a fixed interval after the automations of the first of the batches begin.

* * * * *

UNITED STATES PATENT AND TRADEMARK OFFICE
CERTIFICATE OF CORRECTION

PATENT NO. : 11,520,621 B2
APPLICATION NO. : 16/551416
DATED : November 29, 2022
INVENTOR(S) : Khashayar Goudarzi et al.

It is certified that error appears in the above-identified patent and that said Letters Patent is hereby corrected as shown below:

In the Claims

Column 33, Claim 1, Line 20 - delete the word "computational".

Signed and Sealed this
Twenty-first Day of February, 2023

Katherine Kelly Vidal
*Director of the United States Patent and Trademark Office*